US012156122B2

(12) United States Patent
Abotabl et al.

(10) Patent No.: US 12,156,122 B2
(45) Date of Patent: Nov. 26, 2024

(54) CELL BARRING TECHNIQUES FOR CARRIER AGGREGATION IN WIRELESS COMMUNICATIONS

(71) Applicant: QUALCOMM Incorporated, San Diego, CA (US)

(72) Inventors: Ahmed Attia Abotabl, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/740,560

(22) Filed: May 10, 2022

(65) Prior Publication Data

US 2023/0370951 A1   Nov. 16, 2023

(51) Int. Cl.
*H04W 48/16* (2009.01)
*H04W 48/08* (2009.01)
*H04W 48/12* (2009.01)
*H04W 48/18* (2009.01)
*H04W 48/20* (2009.01)
*H04W 88/06* (2009.01)

(52) U.S. Cl.
CPC .......... *H04W 48/08* (2013.01); *H04W 48/20* (2013.01)

(58) Field of Classification Search
CPC .............................. H04W 48/08; H04W 48/20
See application file for complete search history.

(56) References Cited

U.S. PATENT DOCUMENTS

| | | | | |
|---|---|---|---|---|
| 2010/0130218 | A1* | 5/2010 | Zhang | H04W 48/12 455/458 |
| 2020/0314777 | A1* | 10/2020 | Liu | H04W 72/53 |
| 2021/0258062 | A1* | 8/2021 | Koskela | H04W 74/02 |
| 2023/0354221 | A1* | 11/2023 | Han | H04L 27/26 |

FOREIGN PATENT DOCUMENTS

EP    2244412 A2    10/2010

OTHER PUBLICATIONS

International Search Report and Written Opinion—PCT/US2023/065735—ISA/EPO—Jun. 21, 2023.

(Continued)

*Primary Examiner* — Moustapha Diaby
(74) *Attorney, Agent, or Firm* — Dalei Dong; Holland & Hart LLP

(57) ABSTRACT

Methods, systems, and devices for wireless communications are described for cell access techniques in carrier aggregation configurations in which one or more carriers do not provide discovery signals such as synchronization signal block (SSB) transmissions. A UE may be configured with an anchor carrier on which SSBs are transmitted, and one or more non-anchor carriers on which SSBs are not transmitted. A single cell barring indication may be provided for the anchor carrier, in which case the UE may follow cell barring indications for associated non-anchor carriers. In other cases, separate cell barring indications may be provided for one or more anchor carriers and one or more non-anchor carriers.

30 Claims, 16 Drawing Sheets

(56) References Cited

OTHER PUBLICATIONS

Moderator (ZTE) et al., "Moderator's Summary for [RAN94e-R18Prep-27] on CA/DC Enhancements", 3GPP TSG RAN Meeting #94e, RP-212687, 3rd Generation Partnership Project (3GPP), Mobile Competence Centre, 650, Route Des Lucioles, F-06921 Sophia-Antipolis Cedex, France, vol. RAN WG3, No. Electronic Meeting, Dec. 6, 2021-Dec. 17, 2021, 51 Pages, Nov. 1, 2021, XP052073756, Section 4.2.

VIVO: "Discussions on Network Energy Saving Techniques", 3GPP TSG RAN WG1 #109-e, R1-2203576, 3rd Generation Partnership Project (3GPP), Mobile Competence Centre, 650, Route Des Lucioles, F-06921 Sophia-Antipolis Cedex, France, vol. RAN WG1, No. e-Meeting, May 9, 2022-May 20, 2022, 8 Pages, Apr. 29, 2022, XP052153051, Section 5.

\* cited by examiner

CELL BARRING TECHNIQUES FOR CARRIER AGGREGATION IN WIRELESS COMMUNICATIONS

FIELD OF TECHNOLOGY

The following relates to wireless communications, including cell barring techniques for carrier aggregation in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, carrier aggregation techniques may be used to help enhance data rates and system efficiency. Such carrier aggregation techniques may include enabling concurrent communications via two or more component carriers associate with two or more cells (e.g., a primary cell (PCell) and a one or more secondary cells (SCells)). Efficient techniques for management of communications that use carrier aggregation techniques may help to enhance the overall efficiency and capacity of wireless communications systems that use carrier aggregation.

SUMMARY

The described techniques relate to improved methods, systems, devices, and apparatuses that support cell barring techniques for carrier aggregation (CA) in wireless communications. In some cases, one or more cells in a CA configuration may transmit discovery signals (e.g., synchronization signal block (SSB) transmissions) that provide information that may be used for a cell access procedure (e.g., a random access channel (RACH) procedure used for cell access), and one or more other cells in the CA configuration may not transmit discovery signals or transmit reduced numbers of such signals. Further, in some cases, one or more cells may be unavailable for new cell access procedures from a user equipment (UE), such as cases where the cell is not able to support additional connections (e.g., due to being capacity constrained). A cell in such cases may provide a cell barring indication in associated discovery signals (e.g., in a master information block (MIB) provided with a SSB). In accordance with various aspects discussed herein, cell barring behavior for a cell that does not transmit discovery signals may be determined based at least in part on discovery signals of another cell.

In some cases, a UE may be configured with an anchor carrier on which SSBs are transmitted, and one or more non-anchor carriers on which SSBs are not transmitted or are transmitted relatively infrequently. The UE in such cases may follow cell barring indications for the anchor carrier for associated non-anchor carrier(s), which also may be referred to as SSB-less carriers. In some cases, separate cell barring fields for one or more SSB-less carriers may be provided on the anchor carrier. The separate cell barring fields may include a field for the anchor carrier and either a common field for all configured non-anchor carriers or separate fields for each configured non-anchor carrier. The cell barring indication(s) may be provided via a MIB in the SSB, or via unified access control (UAC) in a SIB (e.g., that is decoded from a control resource set (CORESET) that is identified based on information from the SSB). Additionally, or alternatively, in some cases initial access availability for a virtual cell (e.g., a cell that includes an anchor carrier and one or more non-anchor carriers) may be based on a RACH configuration and cell barring indication, where cell barring for any CA carrier indicates that RACH is unavailable for the virtual cell.

A method for wireless communication at a user equipment (UE) is described. The method may include receiving a synchronization signal block via a first carrier of two or more carriers used for communications in a carrier aggregation scheme, the two or more carriers including the first carrier associated with a first cell and a second carrier associated with a second cell, where synchronization signal block transmissions are absent from the second carrier and initiating an initial access procedure at the UE to initiate communications via one or more of the first cell or the second cell, where an availability for cell access at the second cell is determined based on a cell barring indication associated with the synchronization signal block that indicates whether the first cell is available for cell access.

An apparatus for wireless communication at a UE is described. The apparatus may include a processor, memory coupled with the processor, and instructions stored in the memory. The instructions may be executable by the processor to cause the apparatus to receive a synchronization signal block via a first carrier of two or more carriers used for communications in a carrier aggregation scheme, the two or more carriers including the first carrier associated with a first cell and a second carrier associated with a second cell, where synchronization signal block transmissions are absent from the second carrier and initiate an initial access procedure at the UE to initiate communications via one or more of the first cell or the second cell, where an availability for cell access at the second cell is determined based on a cell barring indication associated with the synchronization signal block that indicates whether the first cell is available for cell access.

Another apparatus for wireless communication at a UE is described. The apparatus may include means for receiving a synchronization signal block via a first carrier of two or more carriers used for communications in a carrier aggregation scheme, the two or more carriers including the first carrier associated with a first cell and a second carrier associated with a second cell, where synchronization signal block transmissions are absent from the second carrier and means for initiating an initial access procedure at the UE to initiate communications via one or more of the first cell or the second cell, where an availability for cell access at the second cell is determined based on a cell barring indication associated with the synchronization signal block that indicates whether the first cell is available for cell access.

A non-transitory computer-readable medium storing code for wireless communication at a UE is described. The code may include instructions executable by a processor to receive a synchronization signal block via a first carrier of two or more carriers used for communications in a carrier aggregation scheme, the two or more carriers including the first carrier associated with a first cell and a second carrier associated with a second cell, where synchronization signal block transmissions are absent from the second carrier and initiate an initial access procedure at the UE to initiate communications via one or more of the first cell or the second cell, where an availability for cell access at the second cell is determined based on a cell barring indication associated with the synchronization signal block that indicates whether the first cell is available for cell access.

Some examples of the method, apparatuses, and non-transitory computer-readable medium described herein may further include operations, features, means, or instructions for delaying an initial access request transmission via the second carrier based on the cell barring indication having a value that indicates the first cell is unavailable for cell access and transmitting the initial access request via the second carrier when the cell barring indication has a value that indicates the first cell is available for cell access. In some examples of the method, apparatuses, and non-transitory computer-readable medium described herein, the first carrier may be an anchor carrier for a virtual cell, and the second carrier may be a non-anchor carrier for the virtual cell. In some examples of the method, apparatuses, and non-transitory computer-readable medium described herein, the synchronization signal block includes the cell barring indication in a master information block (MIB) that is transmitted in the synchronization signal block, where the cell barring indication is for the anchor carrier, and where the cell barring indication is applied to each of the anchor carrier and the non-anchor carrier.

In some examples of the method, apparatuses, and non-transitory computer-readable medium described herein, the cell barring indication in the first carrier includes a first cell barring indication associated with the first cell, and a second cell barring indication associated with the second cell, and where the initial access procedure is initiated for the second cell based on the second cell barring indication. In some examples of the method, apparatuses, and non-transitory computer-readable medium described herein, the carrier aggregation scheme uses at least the first carrier, the second carrier, and a third carrier, and both the second carrier and the third carrier do not carry synchronization signal block transmissions, and where the second cell barring indication applies to each carrier that does not carry synchronization signal block transmissions. In some examples of the method, apparatuses, and non-transitory computer-readable medium described herein, the carrier aggregation scheme uses at least the first carrier, the second carrier, and a third carrier, and both the second carrier and the third carrier do not carry synchronization signal block transmissions, and where the second cell barring indication includes separate indications for each of the second carrier and the third carrier.

In some examples of the method, apparatuses, and non-transitory computer-readable medium described herein, the cell barring indication may be provided by one or more access control parameters in a system information block (SIB) that is transmitted via the first carrier, and where the one or more access control parameters in the SIB are applied to each of the first carrier and the second carrier. In some examples of the method, apparatuses, and non-transitory computer-readable medium described herein, the SIB may be received based on information from the synchronization signal block, and where the one or more access control parameters include separate cell barring indications for the first carrier and the second carrier.

In some examples of the method, apparatuses, and non-transitory computer-readable medium described herein, the first cell and the second cell form a virtual cell for communications according to the carrier aggregation scheme, and where the initiating the initial access procedure may be further based on a random access channel (RACH) configuration of the virtual cell. In some examples of the method, apparatuses, and non-transitory computer-readable medium described herein, the virtual cell may be barred for the initial access procedure if the cell barring indication associated with any of the first cell or the second cell indicates unavailability for cell access.

A method for wireless communication at a network entity is described. The method may include transmitting a synchronization signal block to a UE via a first carrier of two or more carriers used for communications with the UE in a carrier aggregation scheme, the two or more carriers including the first carrier associated with a first cell and a second carrier associated with a second cell, where synchronization signal block transmissions are absent from the second carrier and monitoring for initial access procedure transmissions from the UE to initiate communications via one or more of the first cell or the second cell, where an availability for cell access at the second cell for the initial access procedure transmissions is determined based on a cell barring indication associated with the synchronization signal block that indicates whether the first cell is available for cell access.

An apparatus for wireless communication at a network entity is described. The apparatus may include a processor, memory coupled with the processor, and instructions stored in the memory. The instructions may be executable by the processor to cause the apparatus to transmit a synchronization signal block to a UE via a first carrier of two or more carriers used for communications with the UE in a carrier aggregation scheme, the two or more carriers including the first carrier associated with a first cell and a second carrier associated with a second cell, where synchronization signal block transmissions are absent from the second carrier and monitor for initial access procedure transmissions from the UE to initiate communications via one or more of the first cell or the second cell, where an availability for cell access at the second cell for the initial access procedure transmissions is determined based on a cell barring indication associated with the synchronization signal block that indicates whether the first cell is available for cell access.

Another apparatus for wireless communication at a network entity is described. The apparatus may include means for transmitting a synchronization signal block to a UE via a first carrier of two or more carriers used for communications with the UE in a carrier aggregation scheme, the two or more carriers including the first carrier associated with a first cell and a second carrier associated with a second cell, where synchronization signal block transmissions are absent from the second carrier and means for monitoring for initial access procedure transmissions from the UE to initiate communications via one or more of the first cell or the second cell, where an availability for cell access at the second cell for the initial access procedure transmissions is determined based on a cell barring indication associated with the synchronization signal block that indicates whether the first cell is available for cell access.

A non-transitory computer-readable medium storing code for wireless communication at a network entity is described.

The code may include instructions executable by a processor to transmit a synchronization signal block to a UE via a first carrier of two or more carriers used for communications with the UE in a carrier aggregation scheme, the two or more carriers including the first carrier associated with a first cell and a second carrier associated with a second cell, where synchronization signal block transmissions are absent from the second carrier and monitor for initial access procedure transmissions from the UE to initiate communications via one or more of the first cell or the second cell, where an availability for cell access at the second cell for the initial access procedure transmissions is determined based on a cell barring indication associated with the synchronization signal block that indicates whether the first cell is available for cell access.

Some examples of the method, apparatuses, and non-transitory computer-readable medium described herein may further include operations, features, means, or instructions for delaying the monitoring for the initial access procedure transmissions via the second carrier based on the cell barring indication having a value that indicates the first cell is unavailable for cell access and monitoring for the initial access procedure transmissions via the second carrier when the cell barring indication has a value that indicates the first cell is available for cell access. In some examples of the method, apparatuses, and non-transitory computer-readable medium described herein, the first carrier may be an anchor carrier for a virtual cell, and the second carrier may be a non-anchor carrier for the virtual cell. In some examples of the method, apparatuses, and non-transitory computer-readable medium described herein, the synchronization signal block includes the cell barring indication in a master information block (MIB) that is transmitted in the synchronization signal block, where the cell barring indication is for the anchor carrier, and where the cell barring indication is applied to each of the anchor carrier and the non-anchor carrier.

In some examples of the method, apparatuses, and non-transitory computer-readable medium described herein, the cell barring indication in the first carrier includes a first cell barring indication associated with the first cell, and a second cell barring indication associated with the second cell, and where the initial access procedure is initiated for the second cell based on the second cell barring indication. In some examples of the method, apparatuses, and non-transitory computer-readable medium described herein, the carrier aggregation scheme uses at least the first carrier, the second carrier, and a third carrier, and both the second carrier and the third carrier do not carry synchronization signal block transmissions, and where the second cell barring indication applies to each carrier that does not carry synchronization signal block transmissions. In some examples of the method, apparatuses, and non-transitory computer-readable medium described herein, the carrier aggregation scheme uses at least the first carrier, the second carrier, and a third carrier, and both the second carrier and the third carrier do not carry synchronization signal block transmissions, and where the second cell barring indication includes separate indications for each of the second carrier and the third carrier.

In some examples of the method, apparatuses, and non-transitory computer-readable medium described herein, the cell barring indication may be provided by one or more access control parameters in an SIB that may be transmitted via the first carrier, and where the one or more access control parameters in the SIB are applied to each of the first carrier and the second carrier. In some examples of the method, apparatuses, and non-transitory computer-readable medium described herein, the SIB may be transmitted using resources that are indicated in the synchronization signal block, and where the one or more access control parameters include separate cell barring indications for the first carrier and the second carrier.

In some examples of the method, apparatuses, and non-transitory computer-readable medium described herein, the first cell and the second cell form a virtual cell for communications according to the carrier aggregation scheme, and where cell access associated with the initial access procedure may be further based on a RACH configuration of the virtual cell. In some examples of the method, apparatuses, and non-transitory computer-readable medium described herein, the virtual cell may be barred for the initial access procedure if the cell barring indication associated with any of the first cell or the second cell indicates unavailability for cell access.

DETAILED DESCRIPTION

Figure 1:
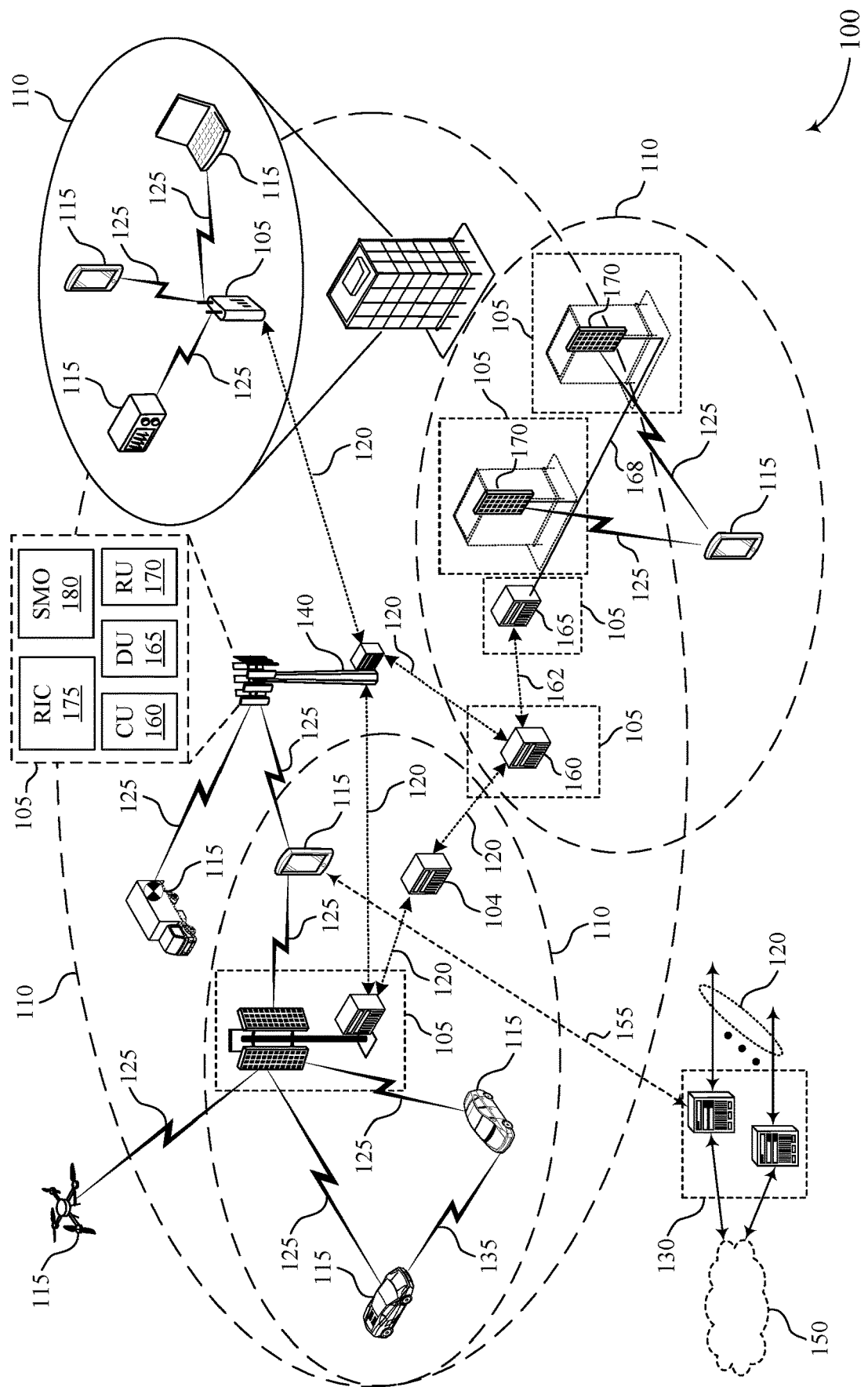
FIG. 1 illustrates an example of a wireless communications system that supports cell barring techniques for carrier aggregation in wireless communications in accordance with one or more aspects of the present disclosure.

In some wireless communications systems, network equipment may consume relatively large amounts of power.

For example, in some fifth generation (5G) systems, radio transmit and receive functions at active antenna units (AAUs) that employ massive multiple-input multiple-output (MIMO) functions may result in between two and three times the power consumption relative to some fourth generation (4G) systems. One factor that contributes to additional power consumption for such 5G systems is periodic transmissions of synchronization signal blocks (SSBs) in multiple different beam directions. One technique to reduce power consumption may be to provide some carriers, such as non-anchor carriers or secondary component carriers (SCCs) in carrier aggregation configurations, that do not transmit SSBs. Such carriers in which SSBs are absent (or are transmitted relatively infrequently) may be referred to as SSB-less carriers or non-anchor carriers, and carriers where SSBs are present may be referred to as anchor carriers. By reducing SSB transmissions, a substantial amount of transmissions for non-anchor carriers may be avoided, which may reduce power consumption, may reduce system overhead, and may thus increase overall system efficiency. System information (e.g., from a master information block (MIB) provided with a SSB) for such SSB-less carriers, in some cases, may be provided via an associated anchor carrier. In some cases, a virtual cell may include an anchor carrier that has SSBs, and one or more non-anchor carriers that are SSB-less carriers. However, such techniques may present issues for cell access (e.g. random access channel (RACH) procedures used for cell access). For example, cell barring may be indicated by a MIB in a SSB transmitted via a carrier and, if present, a UE may not be allowed to transmit a RACH request to the cell via the associated carrier. However, for SSB-less carriers, it is ambiguous whether a UE may transmit a random access request via the carrier. Thus, techniques for determining the availability of a SSB-less carrier for cell access communications are desirable.

In accordance with various aspects discussed herein, one or more cells in a CA configuration may transmit discovery signals (e.g., SSB transmissions) that provide information that may be used for an initial access procedure (e.g., a RACH procedure), and one or more other cells in the CA configuration may not transmit discovery signals or transmit reduced numbers of such signals. Further, in some cases, one or more cells may be unavailable for new initial access procedures by a user equipment (UE), such as cases where the cell is not able to support additional connections (e.g., due to being capacity constrained). A cell in such cases may provide a cell barring indication in associated discovery signals (e.g., in a MIB provided with a SSB). In accordance with various aspects discussed herein, cell barring behavior for a cell that does not transmit discovery signals may be determined based at least in part on discovery signals of another cell.

In some cases, a UE may be configured with an anchor carrier on which SSBs are transmitted, and one or more non-anchor carriers on which SSBs are not transmitted or are transmitted relatively infrequently. The UE in such cases may follow cell barring indications for the anchor carrier for associated non-anchor carrier(s), which also may be referred to as SSB-less carriers. In some cases, separate cell barring fields for one or more SSB-less carriers may be provided on the anchor carrier. The separate cell barring fields may include a field for the anchor carrier and either a common field for all configured non-anchor carriers or separate fields for each configured non-anchor carrier. The cell barring indication(s) may be provided via a MIB in the SSB, or via unified access control (UAC) in a SIB (e.g., that is decoded from a control resource set (CORESET) that is identified based on information from the SSB). Further, initial access availability for a virtual cell may be based on a RACH configuration and cell barring indication, where cell barring for any CA carrier indicates that RACH is unavailable for the virtual cell.

Aspects of the disclosure are initially described in the context of wireless communications systems. Aspects of the disclosure are further illustrated by and described with reference to virtual cell carriers, a process flow, apparatus diagrams, system diagrams, and flowcharts that relate to cell barring techniques for carrier aggregation in wireless communications.

FIG. 1 illustrates an example of a wireless communications system 100 that supports cell barring techniques for carrier aggregation in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support cell barring techniques for carrier aggregation in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some cases, a UE 115 may be configured for CA with multiple component carriers. In accordance with various aspects as discussed herein, such a UE 115 may be configured with an anchor carrier on which SSBs are transmitted, and one or more non-anchor carriers on which SSBs are not transmitted (or are transmitted relatively infrequently). The UE 115 in such cases may follow cell barring indications for the anchor carrier for one or more associated non-anchor or SSB-less carriers. In some cases, separate cell barring fields for one or more SSB-less carriers may be provided on the anchor carrier. The separate cell barring fields may include a field for the anchor carrier and either a common field for all configured non-anchor carriers or separate fields for each configured non-anchor carrier. The cell barring indications may be provided via a MIB in the SSB, or via unified access control (UAC) in a SIB (e.g., that is decoded from a CORESET that is identified based on information from the SSB). Further, in some cases initial access availability for a virtual cell may be based on a RACH configuration and cell barring indication, where cell barring for any CA carrier indicates that RACH is unavailable for the virtual cell.

Figure 2:
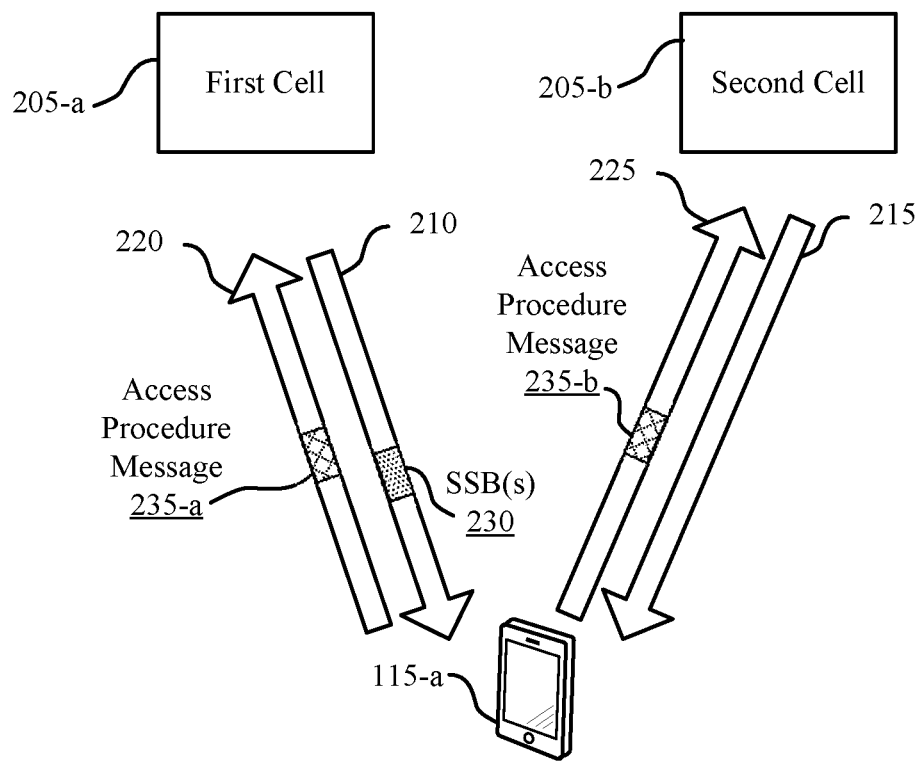
FIG. 2 illustrates an example of a wireless communications system that supports cell barring techniques for carrier aggregation in wireless communications in accordance with one or more aspects of the present disclosure.

FIG. 2 illustrates an example of a wireless communications system 200 that supports cell barring techniques for carrier aggregation in wireless communications in accordance with one or more aspects of the present disclosure. In some examples, aspects of the wireless communications system 200 may implement, or be implemented by, aspects of the wireless communications system 100. The wireless communications system 200 may include a first cell 205-*a* (e.g., that may be served by a network entity 105 of FIG. 1), a second cell 205-*b* (e.g., that may be served by a same or different network entity than the first cell 205-*a*), and a UE 115-*a*, which may be examples of corresponding entities or devices as described with reference to FIG. 1.

The UE 115-*a* may communicate with one or more of the cells 205 using two or more downlink carriers in a CA configuration, including a first carrier 210 that provides downlink communications from the first cell 205-*a* to the UE 115-*a*, and a second carrier 215 that provides downlink communications from the second cell 205-*b* to the UE 115-*a*. The UE 115-*a* may also be configured with multiple uplink carriers in the CA configuration, including a third carrier 220 that provides uplink communications from the UE 115-*a* to the first cell 205-*a*, and a fourth carrier 225 that provides uplink communications from the UE 115-*a* to the second cell 205-*b*. It is noted that the CA configuration illustrated in FIG. 2 is one example of numerous different types of CA configurations. For example, multiple downlink CCs, uplink CCs, or combinations thereof, may be served from a same network entity, or any different combinations of downlink and uplink CCs may be served by different combinations of one or more network entities (e.g., network entities 105 of FIG. 1). Further, the downlink CCs and uplink CCs may be separate carriers in an FDD mode, or may be same carrier in a TDD mode. In some cases, the carriers 210 through 225 may be examples of access links (e.g., Uu links) for uplink and downlink communication.

Additionally, or alternatively, the first cell 205-*a* and the second cell 205-*b* may be served by of first and second transmission-reception points (TRPs) associated with one or more network entities 105. For example, in some cases, the UE 115-*a* may communicate with a first TRP (e.g., TRP1 which may provide first cell 205-*a*) via the first carrier 210 and the third carrier 220, and may communicate with a second TRP (e.g., TRP2 which may provide the second cell 202-*b*) via the second carrier 215 and the fourth carrier 225. In such cases, the first and second TRPs (e.g., TRP1, TRP2) may be associated with the same or different network entities.

As noted previously herein, some wireless communications systems enable operation in a CA mode that serves one or more virtual cells, in which a virtual cell may include an anchor carrier and one or more non-anchor carriers. In the example of FIG. 2, the first carrier 210 may be an anchor carrier that carries periodic SSBs 230, and the second carrier 215 may be a non-anchor carrier that is an SSB-less carrier. When performing cell access, such as a RACH procedure for initial cell access, the UE 115-*a* may transmit an access procedure message 235 via an uplink carrier. For example, the UE 115-*a* may transmit access procedure message 235-*a* via the third carrier 220 to the first cell 205-*a* (e.g., to a primary cell (PCell)), or may transmit access procedure message 235-*b* via the fourth carrier 225 to the second cell 205-*b* (e.g., to a secondary cell (SCell)). Examples of random access procedures for cell access in the presence of one or more SSB-less carriers in CA are discussed with reference to FIGS. 3A and 3B.

Figure 3A:
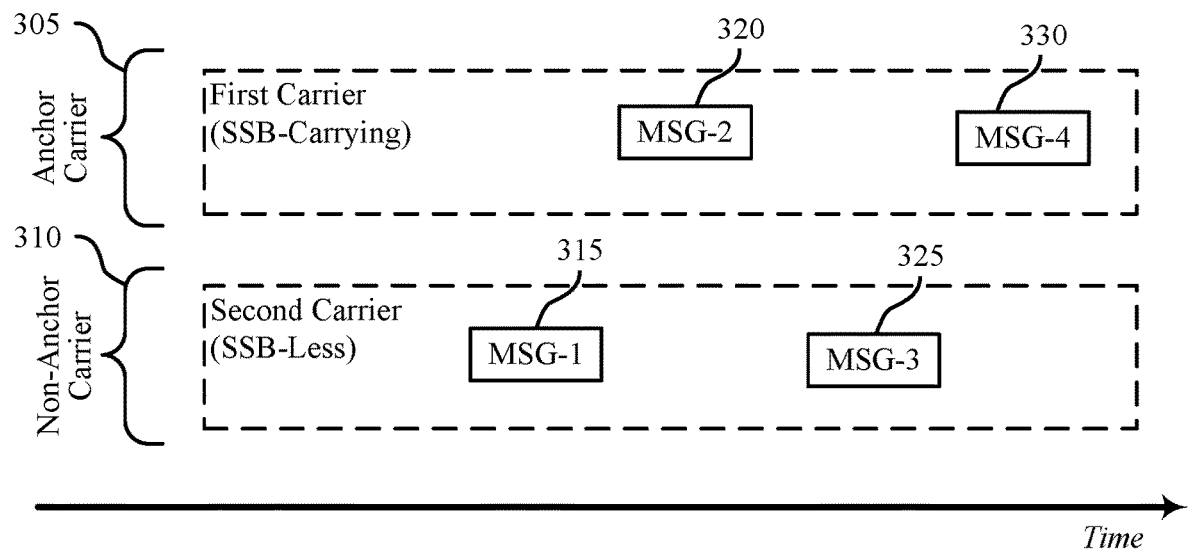
FIGS. 3A and 3B illustrate examples of initial access procedure messages using SSB-less carriers that support cell barring techniques for carrier aggregation in wireless communications in accordance with one or more aspects of the present disclosure.
Figure 3B:
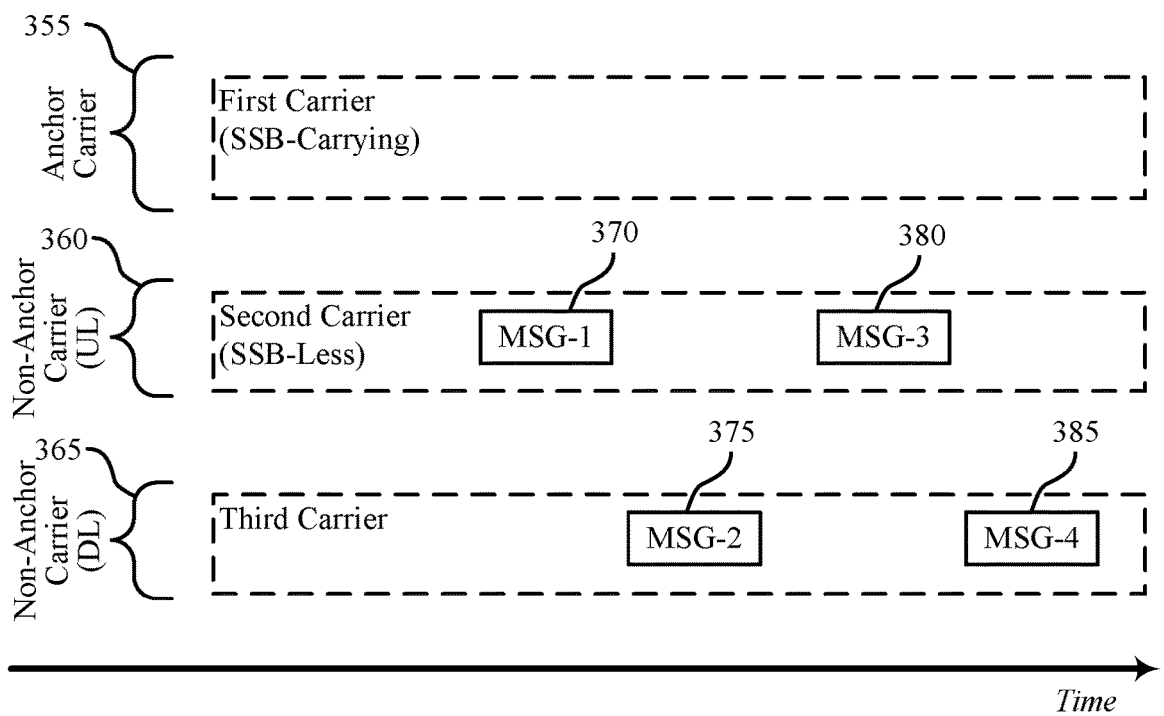

FIGS. 3A and 3B illustrate examples of initial access procedure messages using SSB-less carriers 300 and 350 that support cell barring techniques for carrier aggregation in wireless communications in accordance with one or more aspects of the present disclosure. The initial access procedure messages using SSB-less carriers 300 and 350 may implement or be implemented to realize aspects of the wireless communications systems 100 or 200. For example, the initial access procedure messages using SSB-less carriers 300 and 350 may be implemented by a UE 115, a network entity 105, or both, as illustrated by and described with reference to FIGS. 1-2, to communicate SSBs and perform cell access procedures.

In a first example initial access procedure messages using SSB-less carriers 300 of FIG. 3A, a virtual cell may be configured with an anchor carrier 305 (e.g. a first carrier) and a non-anchor carrier 310 (e.g., a second carrier). In this example, the anchor carrier 305 may carry SSBs that may be monitored for at a UE. The SSBs may include information for accessing the virtual cell, such as MIB information and information that indicates a location of a CORESET. The non-anchor carrier 310 in this example may be an SSB-less carrier, and may be in a same band as the anchor carrier 305 or in a different band than the anchor carrier 305. In this example, a cell access procedure may be performed by a UE using the non-anchor carrier 310 to transmit a first message 315 (e.g., a random access request or MSG-1 transmission in a RACH initial access procedure). In this example, a second message 320 (e.g., a random access response or MSG-2 transmission in the RACH initial access procedure) may be transmitted to the UE via the anchor carrier 305. In this example, the cell access procedure may be a contention-based RACH procedure, where a third message 325 (e.g., an uplink shared channel message or MSG-3 transmission in the RACH initial access procedure) may be transmitted using the non-anchor carrier 310, followed by a fourth message 330 (e.g., a downlink shared or control channel message or MSG-4 transmission in the RACH initial access procedure). transmitted using the anchor carrier 305. Thus, in the example of FIG. 3A, some cell access messages may be transmitted via the non-anchor carrier 310 which may reduce overhead on the anchor carrier 305 and may also reduce the likelihood of collisions in RACH procedures.

In other cases, all cell access messages of a cell access procedure may be transmitted via one or more non-anchor carriers. An example of such a technique is illustrated in FIG. 3B, in which a virtual cell may be configured with an anchor carrier 355, a first non-anchor carrier 360 (e.g., an SSB-less non-anchor carrier), and a second non-anchor carrier 365 (e.g., a different non-anchor carrier). In other examples, one or more non-anchor carriers may operate in the TDD mode in which uplink and downlink communications are carried on a same carrier. In this example, the anchor carrier 355 may carry SSBs that may be monitored for at a UE. The SSBs may include information for accessing the virtual cell, such as MIB information and information that indicates a location of a CORESET. The first non-anchor carrier 360 in this example may be an SSB-less carrier, and may be in a same band as the anchor carrier 355 or in a different band than the anchor carrier 355. Likewise, the second non-anchor carrier 365 in this example may be an SSB-less carrier, and may be in a same band as the anchor carrier 355 or in a different band than the anchor carrier 355. In this example, a cell access procedure may be performed in which all of the associated messages are carried by the first non-anchor carrier 360 and the second non-anchor carrier 365. For example, a UE may use the first non-anchor carrier 360 to transmit first message 370 (e.g., a MSG-1 transmission) and third message 380 (e.g., a MSG-3 transmission), and may receive a second message 375 (e.g., a MSG-2 transmission) and fourth message 385 (e.g., a MSG-4 transmission) via second non-anchor carrier 365.

As discussed previously, in some cases a cell barring indication may be provided in a MIB that is carried in SSB transmissions, which may inform the UE whether the cell is barred from access. In some cases, the barring indication may be provided per anchor carrier 305, 355 (e.g., per Pcell). Additionally, in some cases certain cells may be prevented from being selected for cell access due to load control reasons, such as in accordance with unified access control (UAC) techniques. In accordance with various aspects discussed herein, such a cell barring indication may be used to indicate whether a UE may perform cell access using one or more SSB-less carriers. In some cases, if a cell barring flag in an acquired MIB in an anchor carrier 305, 355 is set to barred, it may be applied to all associated carriers. For example, in FIG. 3A, if an MIB carried in an SSB via the anchor carrier 305 indicates the first cell is barred, the UE may not perform cell access via anchor carrier 305 or non-anchor carrier 310 (or any other non-anchor carriers as part of a virtual cell configured in system information).

In other aspects, a cell barring indication provided in an anchor carrier 305, 355, MIB may provide a cell barring flag associated with the anchor carrier 305, 355, and one or more additional cell barring flag(s) for one or more associated non-anchor carriers (e.g., non-anchor carriers 310, 360, 365) as part of a virtual cell. In some cases, one additional flag for cell barring may be a common flag for all non-anchor carriers of the virtual cell. For example, in FIG. 3B, a first indication (e.g., a first cell barring flag) in a MIB provided in SSB on the anchor carrier 355 may indicate cell barring for the anchor carrier 355, and a second indication (e.g., a second cell barring flag) in the MIB may indicate cell barring for each configured non-anchor carrier, such as first non-anchor carrier 360 and second non-anchor carrier 365. In other examples, separate cell barring indications may be provided for each carrier associated with a virtual cell, which may independently indicate whether the associated anchor or non-anchor carrier may be used for cell access.

Additionally, or alternatively, in some cases availability of cells for cell access messages may be provided using UAC and information provided in a system information block (e.g., in SIB1) that is provided in a CORESET associated with the SSB transmissions. In some cases, UAC parameters of the anchor carrier may be used for each configured non-anchor carrier. In other cases, one or more additional UAC parameters may be provided for a set of one or more non-anchor carriers. In such cases, since RACH procedures may involve the anchor carrier, one or more non-anchor carriers, or combinations thereof, system information may include configuration information to indicate which carriers are used for RACH. A UE may decode the system information and use the one or more cell barring flags and RACH configuration (e.g., including carrier selection) to determine whether the virtual cell is accessible or not for cell access communications. In some cases, if at least one of the carriers selected for RACH is barred, the virtual cell is barred for cell access.

Figure 4:
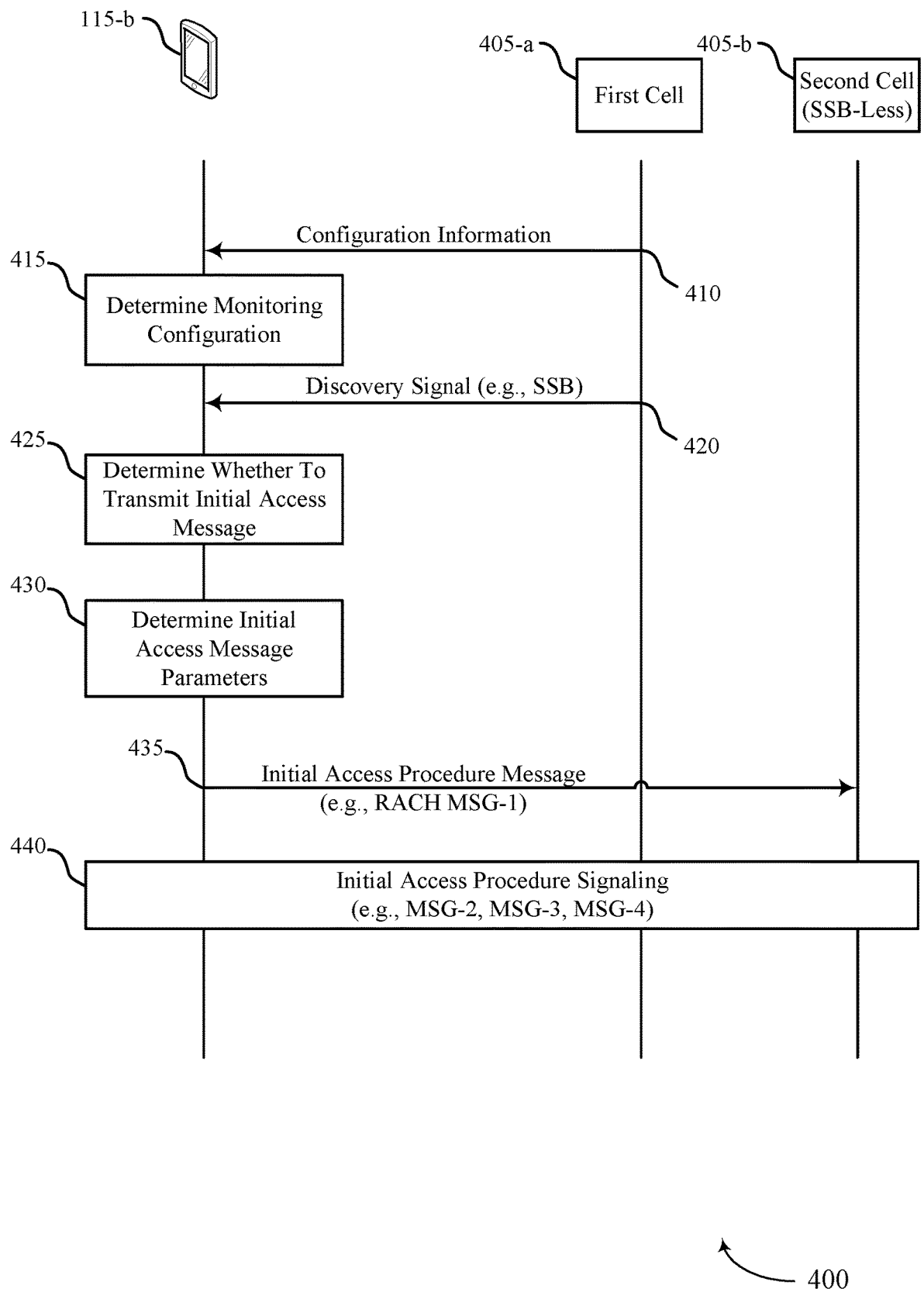
FIG. 4 illustrates an example of a process flow that supports cell barring techniques for carrier aggregation in wireless communications in accordance with one or more aspects of the present disclosure.

FIG. 4 illustrates an example of a process flow 400 that supports cell barring techniques for carrier aggregation in wireless communications in accordance with one or more aspects of the present disclosure. Aspects of the process flow 400 may implement, or be implemented by, aspects of the wireless communications systems 100 or 200, or any combination thereof. In particular, the process flow 400 illustrates a UE 115-b, a first cell 405-a (e.g., that provides an anchor carrier), and a second cell 405-b (e.g., that provides a SSB-less carrier) that may support cell barring techniques for carrier aggregation, as described with reference to FIGS. 1-3, among other aspects.

In some examples, the operations illustrated in process flow 400 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 410, the first cell 405-*a* may provide (e.g., transmit), to the UE 115-*b*, configuration information. In other words, the UE 115-*b* may obtain (e.g., receive) configuration information from the first cell 405-*a*, which may provide an anchor carrier or PCell in a CA configuration. The configuration information may be provided in an RRC message, a DCI message, a MAC-CE message, and the like. In some cases, the configuration information may include information for performing a cell access procedure for one or more cells that may include one or more anchor carriers, one or more non-anchor carriers, or any combinations thereof, as discussed in various aspects herein.

At 415, the UE 115-*b* may determine a monitoring configuration. For example, the first UE 115-*b* may determine that discovery signals, such as SSBs, via a first carrier served by the first cell 405-*a* are to be monitored. At 420, the first cell 405-*a* may output (e.g., transmit) discovery signals, such as a periodic SSB transmissions.

At 425, the UE 115-*b* may determine whether to transmit an initial access message for a cell access procedure. In some cases, the initial access message may be transmitted based on data arriving in an uplink buffer at the UE 115-*a* that is to be transmitted to a network via one or more of the first cell 405-*a* or the second cell 405-*b*. In other cases, the initial access message may be transmitted based on a paging notification received at the UE 115-*b*.

At 430, the UE 115-*b* may determine initial access message parameters. In accordance with various techniques as discussed herein, the UE 115-*b* may determine parameters that include a cell to which an initial access message may be sent. For example, based on a cell barring indication provided by the first cell, the UE 115-*b* may determine that an initial access procedure message (e.g., a RACH MSG-1 random access request) is to be transmitted via the second cell 405-*b*, and at 435 the UE 115-*b* may transmit the initial access procedure message via the second cell 405-*b*. At 440, the UE 115-*b*, first cell 405-*a*, and second cell 405-*b* may complete the initial access procedure, such as by exchanging further RACH messages (e.g., MSG-2, MSG-3, MSG-4) via one or both the first cell 405-*a* or the second cell 405-*b*.

Figure 5:
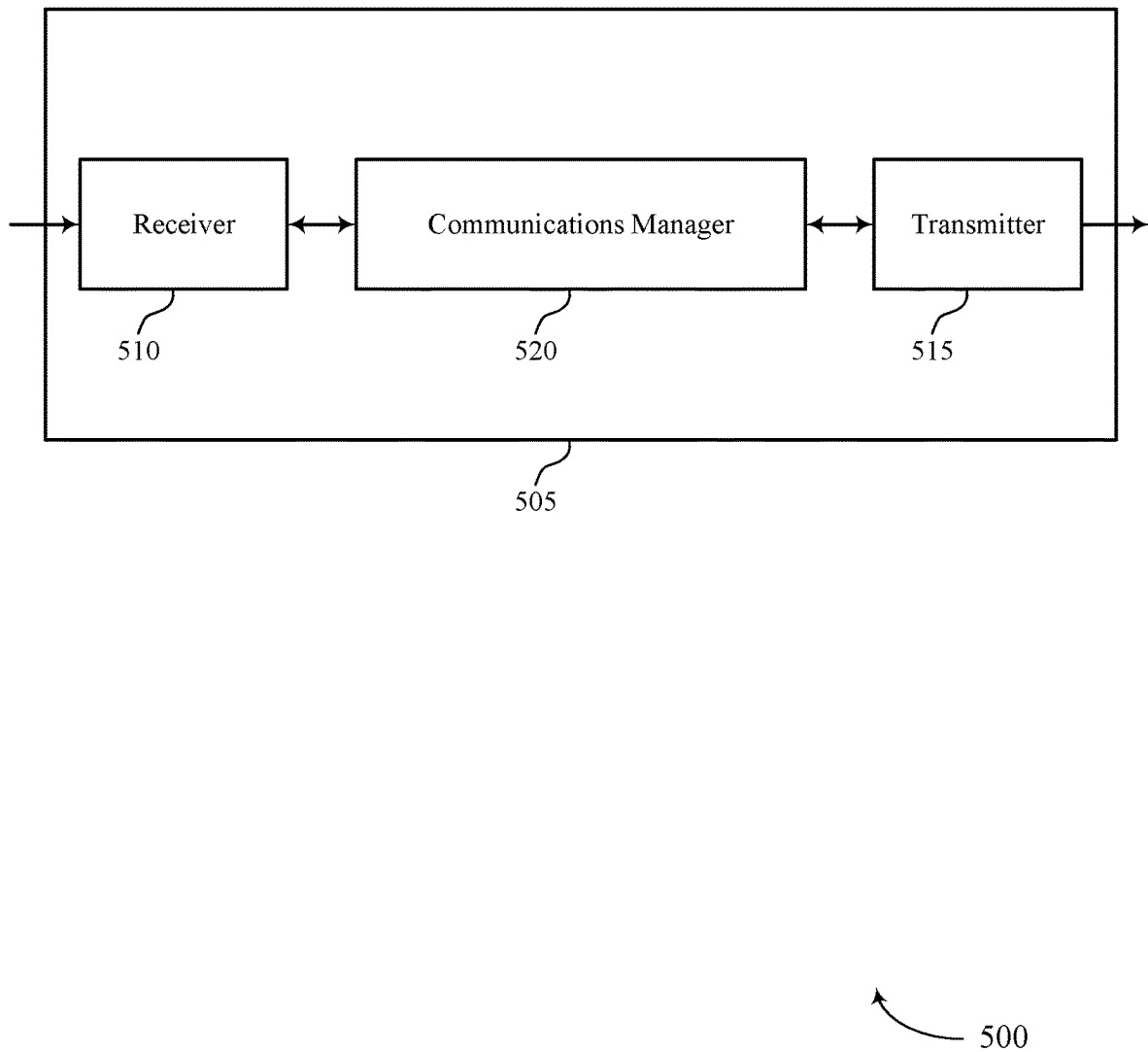
FIGS. 5 and 6 show block diagrams of devices that support cell barring techniques for carrier aggregation in wireless communications in accordance with one or more aspects of the present disclosure.

FIG. 5 shows a block diagram 500 of a device 505 that supports cell barring techniques for carrier aggregation in wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to cell barring techniques for carrier aggregation in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to cell barring techniques for carrier aggregation in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of cell barring techniques for carrier aggregation in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving a SSB (or other discovery signal) via a first carrier of two or more carriers used for communications in a carrier aggregation scheme, the two or more carriers including the first carrier associated with a first cell and a second carrier associated with a second cell, where SSB transmissions (or other discovery signals) are absent from the second carrier. The communications manager 520 may be configured as or otherwise support a means for initiating an initial access procedure at the UE to initiate communications via one or more of the first cell or the second cell, where an availability for cell access at the second cell is determined based on a cell barring indication associated with the SSB that indicates whether the first cell is available for cell access.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for cell access via one or more anchor carriers, one or more non-anchor carriers, of any combinations thereof, which may provide flexibility in scheduling different carriers, enhance efficiency of communications, provide more efficient use of wireless resources, and enhance reliability of communications.

Figure 6:
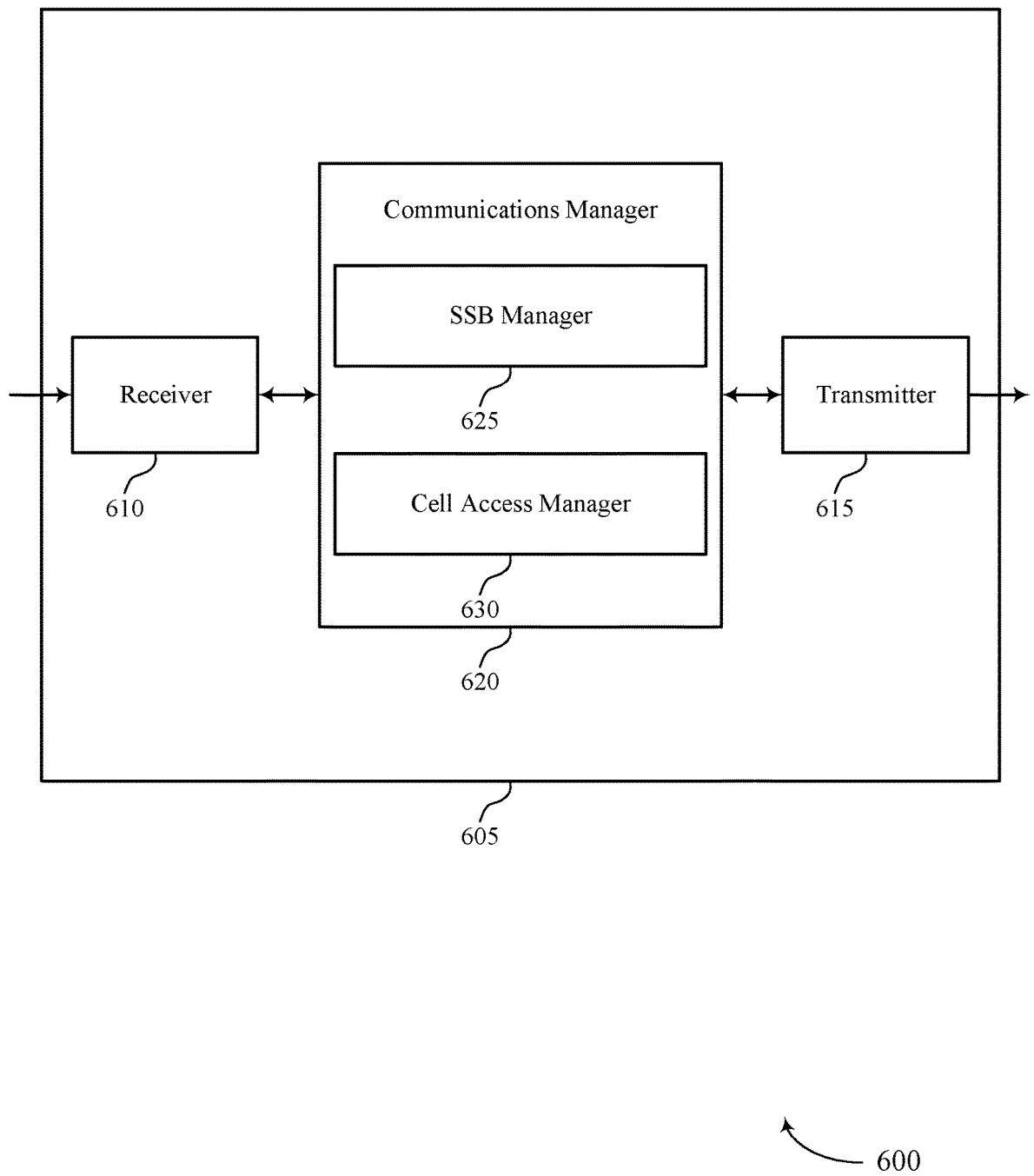

FIG. 6 shows a block diagram 600 of a device 605 that supports cell barring techniques for carrier aggregation in wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to cell barring techniques for carrier aggregation in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to cell barring techniques for carrier aggregation in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of cell barring techniques for carrier aggregation in wireless communications as described herein. For example, the communications manager 620 may include an SSB manager 625 a cell access manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The SSB manager 625 may be configured as or otherwise support a means for receiving a SSB via a first carrier of two or more carriers used for communications in a carrier aggregation scheme, the two or more carriers including the first carrier associated with a first cell and a second carrier associated with a second cell, where SSB transmissions are absent from the second carrier. The cell access manager 630 may be configured as or otherwise support a means for initiating an initial access procedure at the UE to initiate communications via one or more of the first cell or the second cell, where an availability for cell access at the second cell is determined based on a cell barring indication associated with the SSB that indicates whether the first cell is available for cell access.

Figure 7:
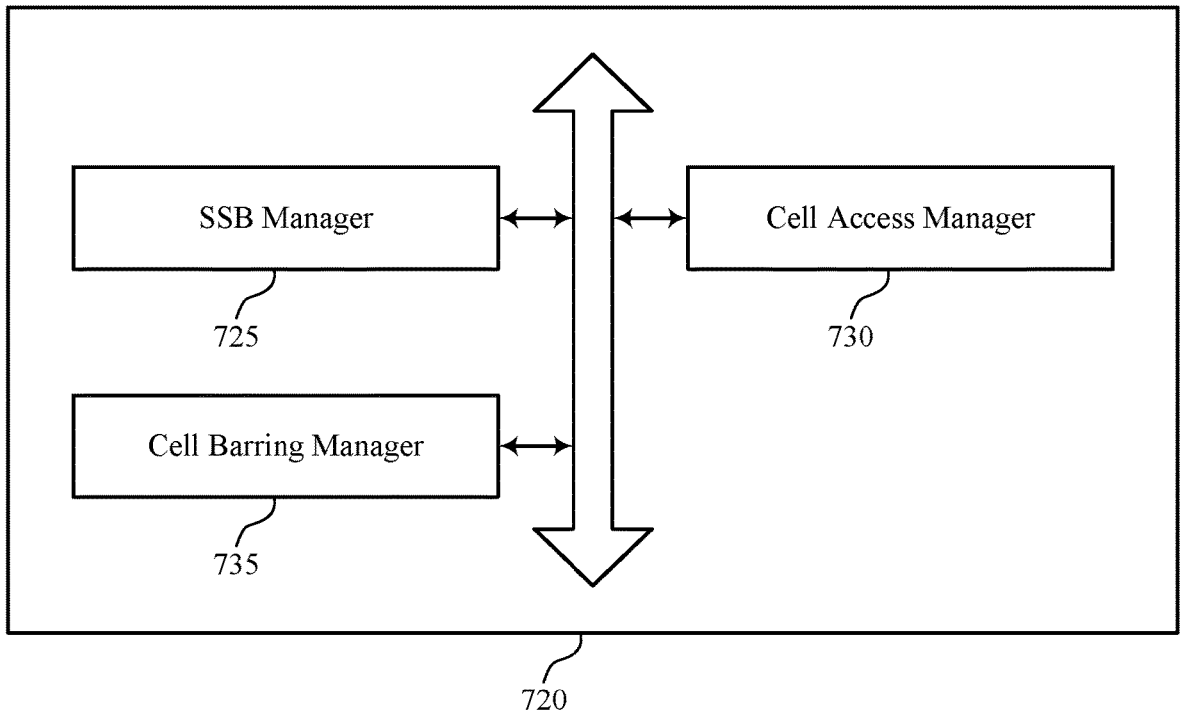
FIG. 7 shows a block diagram of a communications manager that supports cell barring techniques for carrier aggregation in wireless communications in accordance with one or more aspects of the present disclosure.

FIG. 7 shows a block diagram 700 of a communications manager 720 that supports cell barring techniques for carrier aggregation in wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of cell barring techniques for carrier aggregation in wireless communications as described herein. For example, the communications manager 720 may include an SSB manager 725, a cell access manager 730, a cell barring manager 735, or any combination thereof. Each of these components may communicate, directly or indirectly, with one another (e.g., via one or more buses).

The communications manager 720 may support wireless communication at a UE in accordance with examples as disclosed herein. The SSB manager 725 may be configured as or otherwise support a means for receiving a SSB via a first carrier of two or more carriers used for communications in a carrier aggregation scheme, the two or more carriers including the first carrier associated with a first cell and a second carrier associated with a second cell, where SSB transmissions are absent from the second carrier. The cell access manager 730 may be configured as or otherwise support a means for initiating an initial access procedure at the UE to initiate communications via one or more of the first cell or the second cell, where an availability for cell access at the second cell is determined based on a cell barring indication associated with the SSB that indicates whether the first cell is available for cell access.

In some examples, the cell barring manager 735 may be configured as or otherwise support a means for delaying an initial access request transmission via the second carrier based on the cell barring indication having a value that indicates the first cell is unavailable for cell access. In some examples, the cell access manager 730 may be configured as or otherwise support a means for transmitting the initial access request via the second carrier when the cell barring indication has a value that indicates the first cell is available for cell access. In some examples, the first carrier is an anchor carrier for a virtual cell, and the second carrier is a non-anchor carrier for the virtual cell. In some examples, the SSB includes the cell barring indication in a MIB that is transmitted in the SSB, where the cell barring indication is for the anchor carrier, and where the cell barring indication is applied to each of the anchor carrier and the non-anchor carrier.

In some examples, the cell barring indication in the first carrier includes a first cell barring indication associated with the first cell, and a second cell barring indication associated with the second cell, and where the initial access procedure is initiated for the second cell based on the second cell barring indication. In some examples, the carrier aggregation scheme uses at least the first carrier, the second carrier, and a third carrier, and both the second carrier and the third carrier do not carry SSB transmissions, and where the second cell barring indication applies to each carrier that does not carry SSB transmissions. In some examples, the carrier aggregation scheme uses at least the first carrier, the second carrier, and a third carrier, and both the second carrier and the third carrier do not carry SSB transmissions, and where the second cell barring indication includes separate indications for each of the second carrier and the third carrier.

In some examples, the cell barring indication is provided by one or more access control parameters in a SIB that is transmitted via the first carrier, and where the one or more access control parameters in the SIB are applied to each of the first carrier and the second carrier. In some examples, the SIB is received based on information from the SSB, and where the one or more access control parameters include separate cell barring indications for the first carrier and the second carrier.

In some examples, the first cell and the second cell form a virtual cell for communications according to the carrier aggregation scheme, and where the initiating the initial access procedure is further based on a RACH configuration of the virtual cell. In some examples, the virtual cell is barred for the initial access procedure if the cell barring indication associated with any of the first cell or the second cell indicates unavailability for cell access.

Figure 8:
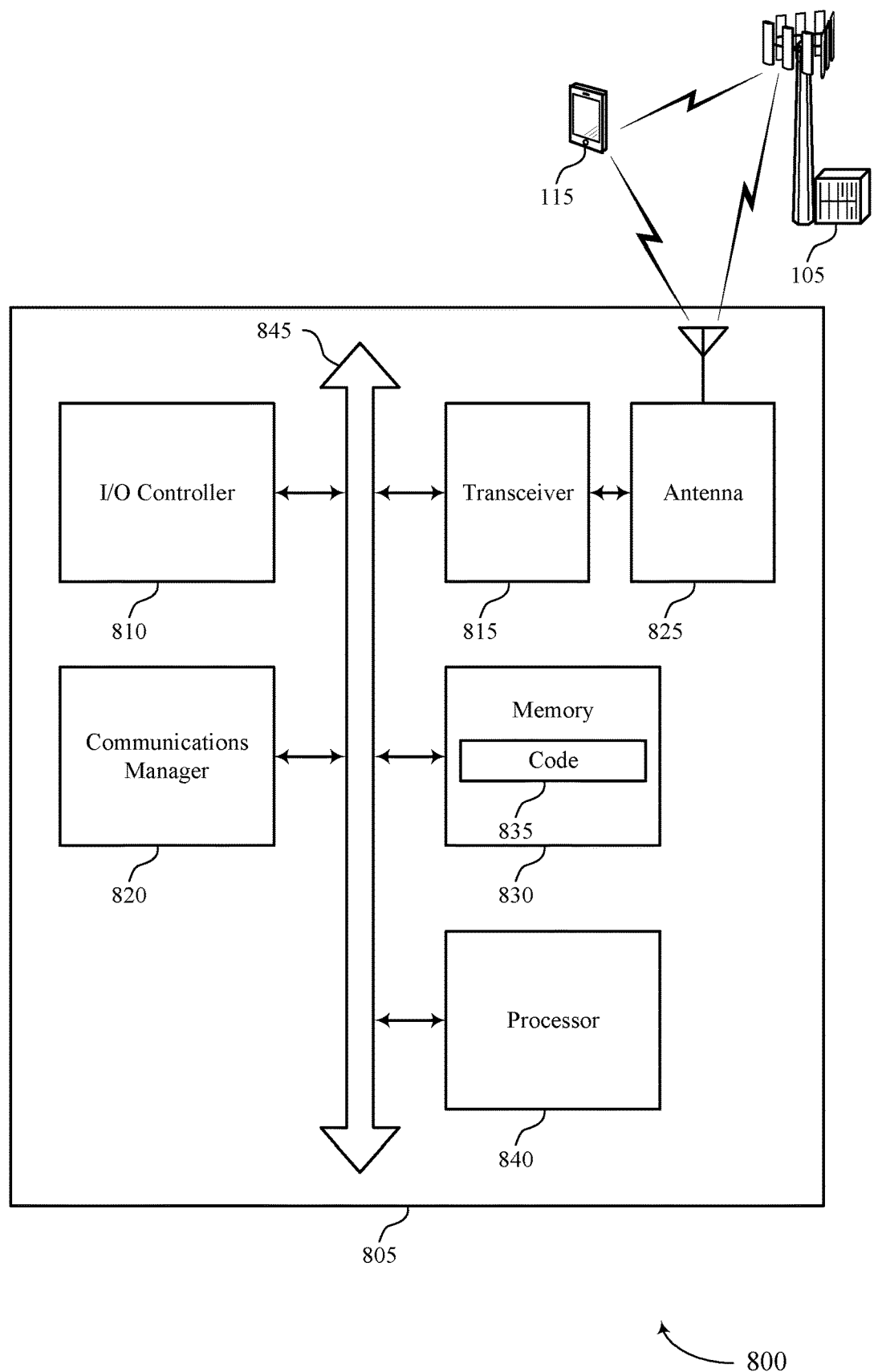
FIG. 8 shows a diagram of a system including a device that supports cell barring techniques for carrier aggregation in wireless communications in accordance with one or more aspects of the present disclosure.

FIG. 8 shows a diagram of a system 800 including a device 805 that supports cell barring techniques for carrier aggregation in wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting cell barring techniques for carrier aggregation in wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a SSB via a first carrier of two or more carriers used for communications in a carrier aggregation scheme, the two or more carriers including the first carrier associated with a first cell and a second carrier associated with a second cell, where SSB transmissions are absent from the second carrier. The communications manager 820 may be configured as or otherwise support a means for initiating an initial access procedure at the UE to initiate communications via one or more of the first cell or the second cell, where an availability for cell access at the second cell is determined based on a cell barring indication associated with the SSB that indicates whether the first cell is available for cell access.

By including or configuring the communications manager 820 in accordance with examples as described herein, the device 805 may support techniques for cell access via one or more anchor carriers, one or more non-anchor carriers, of any combinations thereof, which may provide flexibility in scheduling different carriers, enhance efficiency of communications, provide more efficient use of wireless resources, and enhance reliability of communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of cell barring techniques for carrier aggregation in wireless communications as described herein, or the processor 840 and the memory 830 may be otherwise configured to perform or support such operations.

Figure 9:
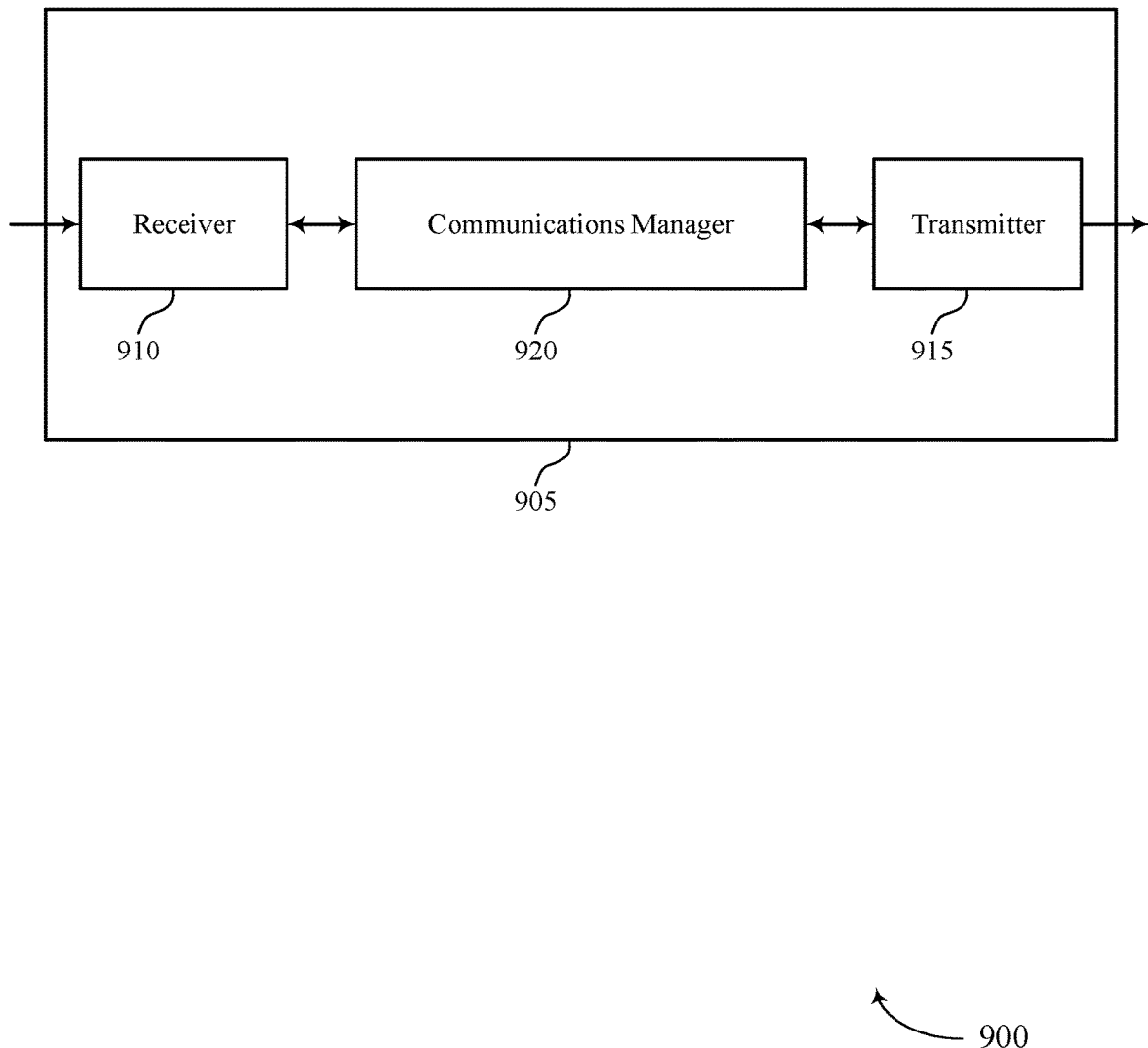
FIGS. 9 and 10 show block diagrams of devices that support cell barring techniques for carrier aggregation in wireless communications in accordance with one or more aspects of the present disclosure.

FIG. 9 shows a block diagram 900 of a device 905 that supports cell barring techniques for carrier aggregation in wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of cell barring techniques for carrier aggregation in wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting a SSB to a UE via a first carrier of two or more carriers used for communications with the UE in a carrier aggregation scheme, the two or more carriers including the first carrier associated with a first cell and a second carrier associated with a second cell, where SSB transmissions are absent from the second carrier. The communications manager 920 may be configured as or otherwise support a means for monitoring for initial access procedure transmissions from the UE to initiate communications via one or more of the first cell or the second cell, where an availability for cell access at the second cell for the initial access procedure transmissions is determined based on a cell barring indication associated with the SSB that indicates whether the first cell is available for cell access.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for cell access via one or more anchor carriers, one or more non-anchor carriers, of any combinations thereof, which may provide flexibility in scheduling different carriers, enhance efficiency of communications, provide more efficient use of wireless resources, and enhance reliability of communications.

Figure 10:
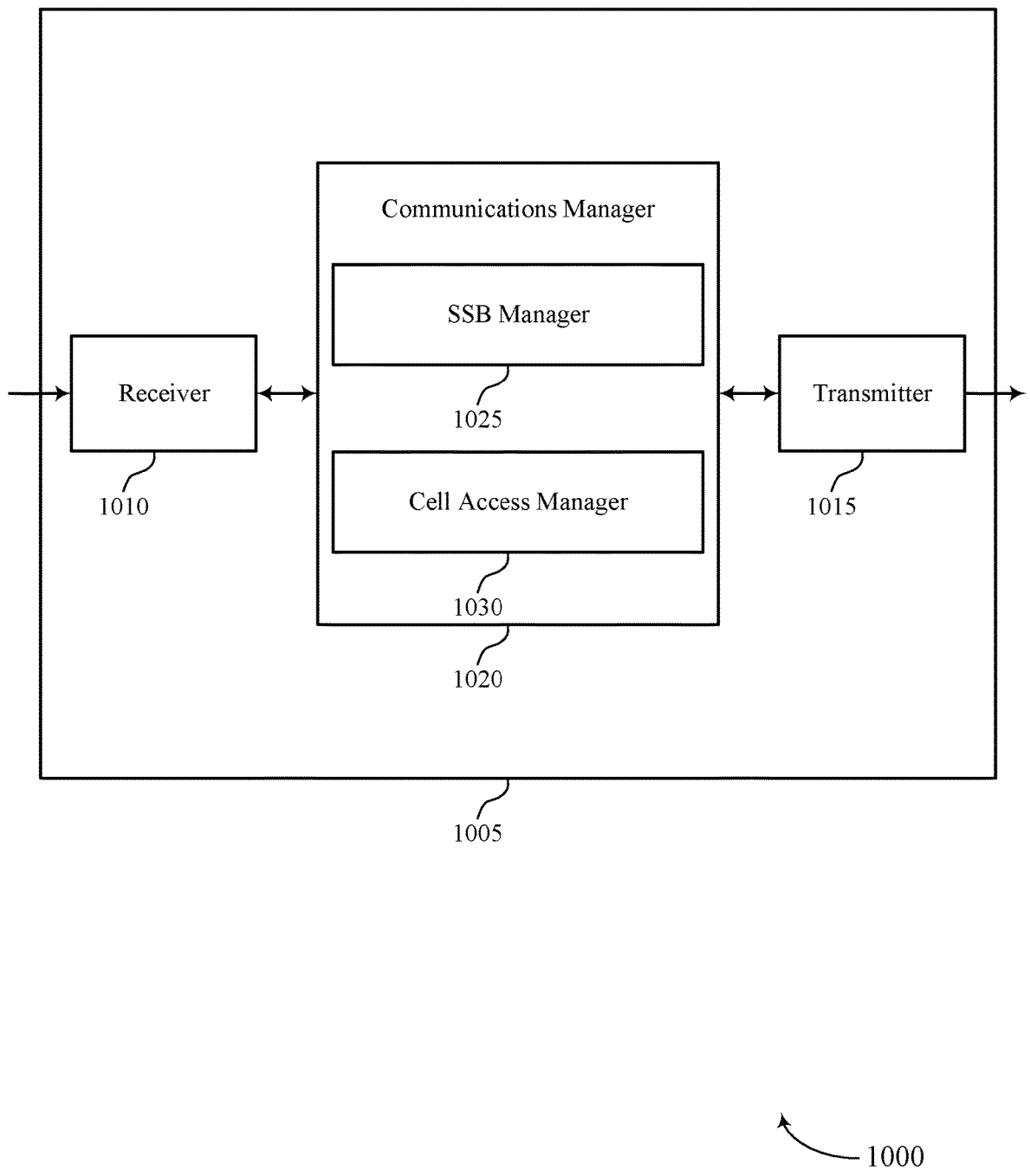

FIG. 10 shows a block diagram 1000 of a device 1005 that supports cell barring techniques for carrier aggregation in wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of cell barring techniques for carrier aggregation in wireless communications as described herein. For example, the communications manager 1020 may include an SSB manager 1025 a cell access manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The SSB manager 1025 may be configured as or otherwise support a means for transmitting a SSB to a UE via a first carrier of two or more carriers used for communications with the UE in a carrier aggregation scheme, the two or more carriers including the first carrier associated with a first cell and a second carrier associated with a second cell, where SSB transmissions are absent from the second carrier. The cell access manager 1030 may be configured as or otherwise support a means for monitoring for initial access procedure transmissions from the UE to initiate communications via one or more of the first cell or the second cell, where an availability for cell access at the second cell for the initial access procedure transmissions is determined based on a cell barring indication associated with the SSB that indicates whether the first cell is available for cell access.

Figure 11:
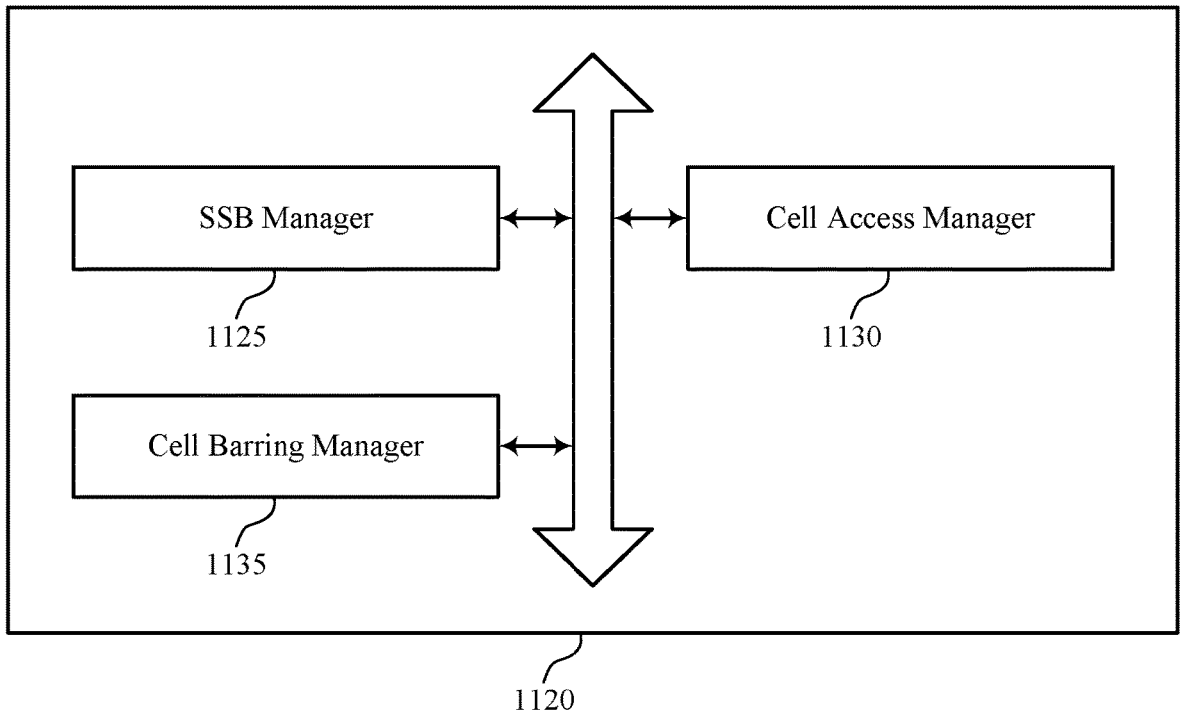
FIG. 11 shows a block diagram of a communications manager that supports cell barring techniques for carrier aggregation in wireless communications in accordance with one or more aspects of the present disclosure.

FIG. 11 shows a block diagram 1100 of a communications manager 1120 that supports cell barring techniques for carrier aggregation in wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of cell barring techniques for carrier aggregation in wireless communications as described herein. For example, the communications manager 1120 may include an SSB manager 1125, a cell access manager 1130, a cell barring manager 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The SSB manager 1125 may be configured as or otherwise support a means for transmitting a SSB to a UE via a first carrier of two or more carriers used for communications with the UE in a carrier aggregation scheme, the two or more carriers including the first carrier associated with a first cell and a second carrier associated with a second cell, where SSB transmissions are absent from the second carrier. The cell access manager 1130 may be configured as or otherwise support a means for monitoring for initial access procedure transmissions from the UE to initiate communications via one or more of the first cell or the second cell, where an availability for cell access at the second cell for the initial access procedure transmissions is determined based on a cell barring indication associated with the SSB that indicates whether the first cell is available for cell access.

In some examples, the cell barring manager 1135 may be configured as or otherwise support a means for delaying the monitoring for the initial access procedure transmissions via the second carrier based on the cell barring indication having a value that indicates the first cell is unavailable for cell access. In some examples, the cell access manager 1130 may be configured as or otherwise support a means for monitoring for the initial access procedure transmissions via the second carrier when the cell barring indication has a value that indicates the first cell is available for cell access.

In some examples, the first carrier is an anchor carrier for a virtual cell, and the second carrier is a non-anchor carrier for the virtual cell. In some examples, the SSB includes the cell barring indication in a MIB that is transmitted in the SSB, where the cell barring indication is for the anchor carrier, and where the cell barring indication is applied to each of the anchor carrier and the non-anchor carrier. In some examples, the cell barring indication in the first carrier includes a first cell barring indication associated with the first cell, and a second cell barring indication associated with the second cell, and where the initial access procedure is initiated for the second cell based on the second cell barring indication. In some examples, the carrier aggregation scheme uses at least the first carrier, the second carrier, and a third carrier, and both the second carrier and the third carrier do not carry SSB transmissions, and where the second cell barring indication applies to each carrier that does not carry SSB transmissions. In some examples, the carrier aggregation scheme uses at least the first carrier, the second carrier, and a third carrier, and both the second carrier and the third carrier do not carry SSB transmissions, and where the second cell barring indication includes separate indications for each of the second carrier and the third carrier.

In some examples, the cell barring indication is provided by one or more access control parameters in an SIB that is transmitted via the first carrier, and where the one or more access control parameters in the SIB are applied to each of the first carrier and the second carrier. In some examples, the SIB is transmitted using resources that are indicated in the SSB, and where the one or more access control parameters include separate cell barring indications for the first carrier and the second carrier.

In some examples, the first cell and the second cell form a virtual cell for communications according to the carrier aggregation scheme, and where cell access associated with the initial access procedure is further based on a RACH configuration of the virtual cell. In some examples, the virtual cell is barred for the initial access procedure if the cell barring indication associated with any of the first cell or the second cell indicates unavailability for cell access.

Figure 12:
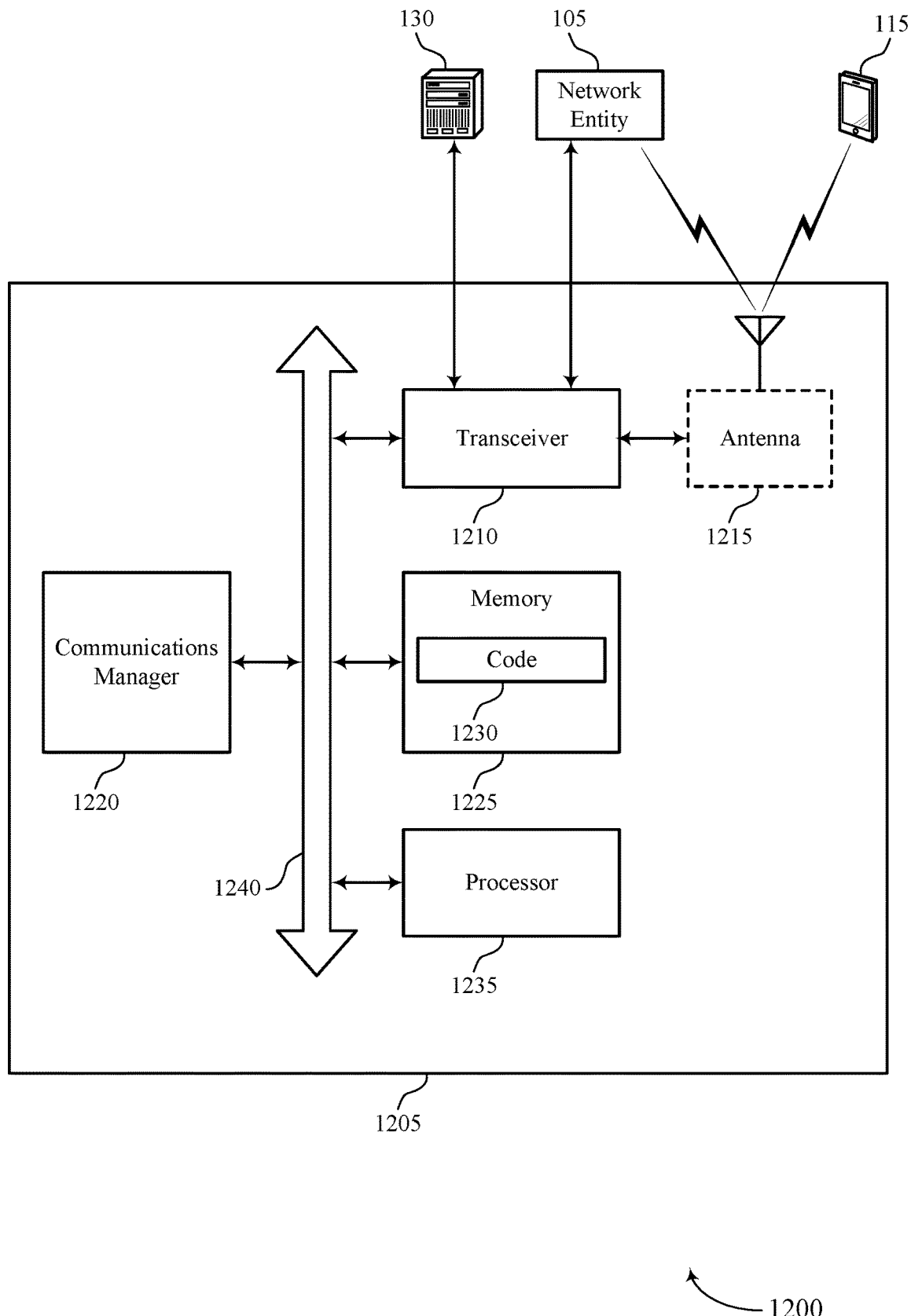
FIG. 12 shows a diagram of a system including a device that supports cell barring techniques for carrier aggregation in wireless communications in accordance with one or more aspects of the present disclosure.

FIG. 12 shows a diagram of a system 1200 including a device 1205 that supports cell barring techniques for carrier aggregation in wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting cell barring techniques for carrier aggregation in wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links).

For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting a synchronization signal block to a UE via a first carrier of two or more carriers used for communications with the UE in a carrier aggregation scheme, the two or more carriers including the first carrier associated with a first cell and a second carrier associated with a second cell, where synchronization signal block transmissions are absent from the second carrier. The communications manager 1220 may be configured as or otherwise support a means for monitoring for initial access procedure transmissions from the UE to initiate communications via one or more of the first cell or the second cell, where an availability for cell access at the second cell for the initial access procedure transmissions is determined based on a cell barring indication associated with the synchronization signal block that indicates whether the first cell is available for cell access.

By including or configuring the communications manager 1220 in accordance with examples as described herein, the device 1205 may support techniques for cell access via one or more anchor carriers, one or more non-anchor carriers, of any combinations thereof, which may provide flexibility in scheduling different carriers, enhance efficiency of communications, provide more efficient use of wireless resources, and enhance reliability of communications.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of cell barring techniques for carrier aggregation in wireless communications as described herein, or the processor 1235 and the memory 1225 may be otherwise configured to perform or support such operations.

Figure 13:
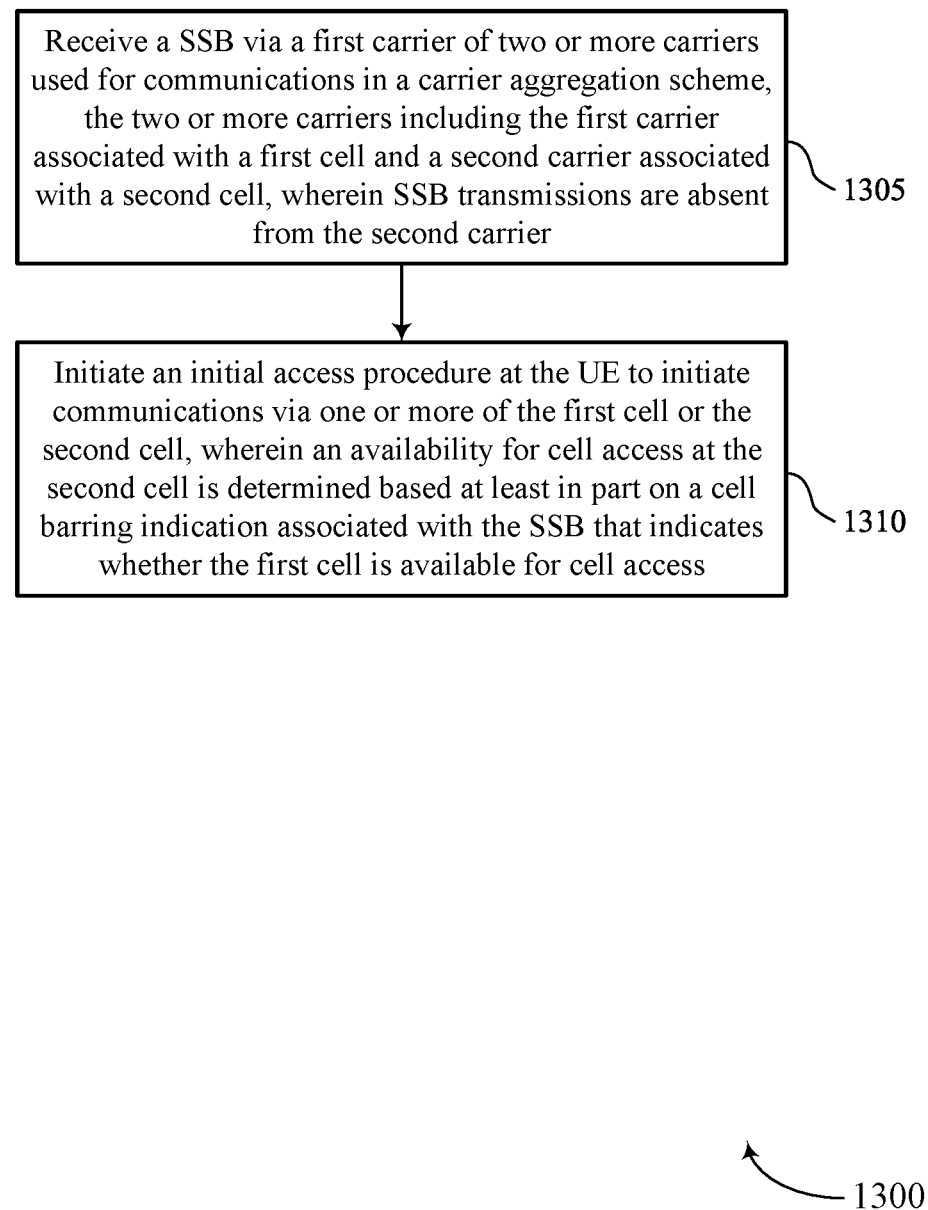
FIGS. 13 through 16 show flowcharts illustrating methods that support cell barring techniques for carrier aggregation in wireless communications in accordance with one or more aspects of the present disclosure.

FIG. 13 shows a flowchart illustrating a method 1300 that supports cell barring techniques for carrier aggregation in wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a SSB via a first carrier of two or more carriers used for communications in a carrier aggregation scheme, the two or more carriers including the first carrier associated with a first cell and a second carrier associated with a second cell, where SSB transmissions are absent from the second carrier. The operations of 1305 may be performed in accordance with examples as disclosed herein. In some examples, aspects of the operations of 1305 may be performed by an SSB manager 725 as described with reference to FIG. 7.

At 1310, the method may include initiating an initial access procedure at the UE to initiate communications via one or more of the first cell or the second cell, where an availability for cell access at the second cell is determined based on a cell barring indication associated with the SSB that indicates whether the first cell is available for cell access. The operations of 1310 may be performed in accordance with examples as disclosed herein. In some examples, aspects of the operations of 1310 may be performed by a cell access manager 730 as described with reference to FIG. 7.

Figure 14:
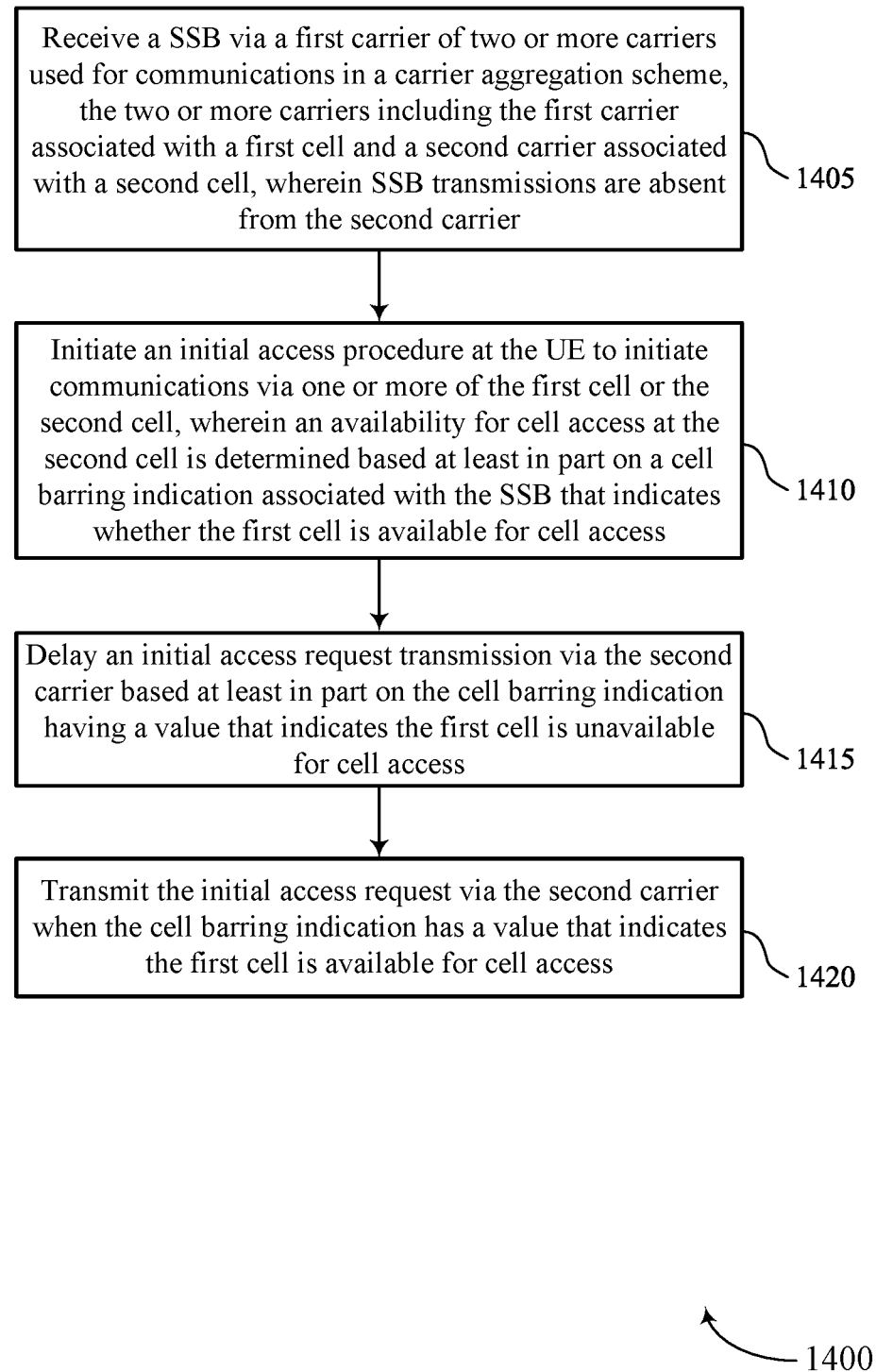

FIG. 14 shows a flowchart illustrating a method 1400 that supports cell barring techniques for carrier aggregation in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a SSB via a first carrier of two or more carriers used for communications in a carrier aggregation scheme, the two or more carriers including the first carrier associated with a first cell and a second carrier associated with a second cell, where SSB transmissions are absent from the second carrier. The operations of 1405 may be performed in accordance with examples as disclosed herein. In some examples, aspects of the operations of 1405 may be performed by an SSB manager 725 as described with reference to FIG. 7.

At 1410, the method may include initiating an initial access procedure at the UE to initiate communications via one or more of the first cell or the second cell, where an availability for cell access at the second cell is determined based on a cell barring indication associated with the SSB that indicates whether the first cell is available for cell access. The operations of 1410 may be performed in accordance with examples as disclosed herein. In some examples, aspects of the operations of 1410 may be performed by a cell access manager 730 as described with reference to FIG. 7.

At 1415, the method may include delaying an initial access request transmission via the second carrier based on the cell barring indication having a value that indicates the first cell is unavailable for cell access. The operations of 1415 may be performed in accordance with examples as disclosed herein. In some examples, aspects of the operations of 1415 may be performed by a cell barring manager 735 as described with reference to FIG. 7.

At 1420, the method may include transmitting the initial access request via the second carrier when the cell barring indication has a value that indicates the first cell is available for cell access. The operations of 1420 may be performed in accordance with examples as disclosed herein. In some examples, aspects of the operations of 1420 may be performed by a cell access manager 730 as described with reference to FIG. 7.

Figure 15:
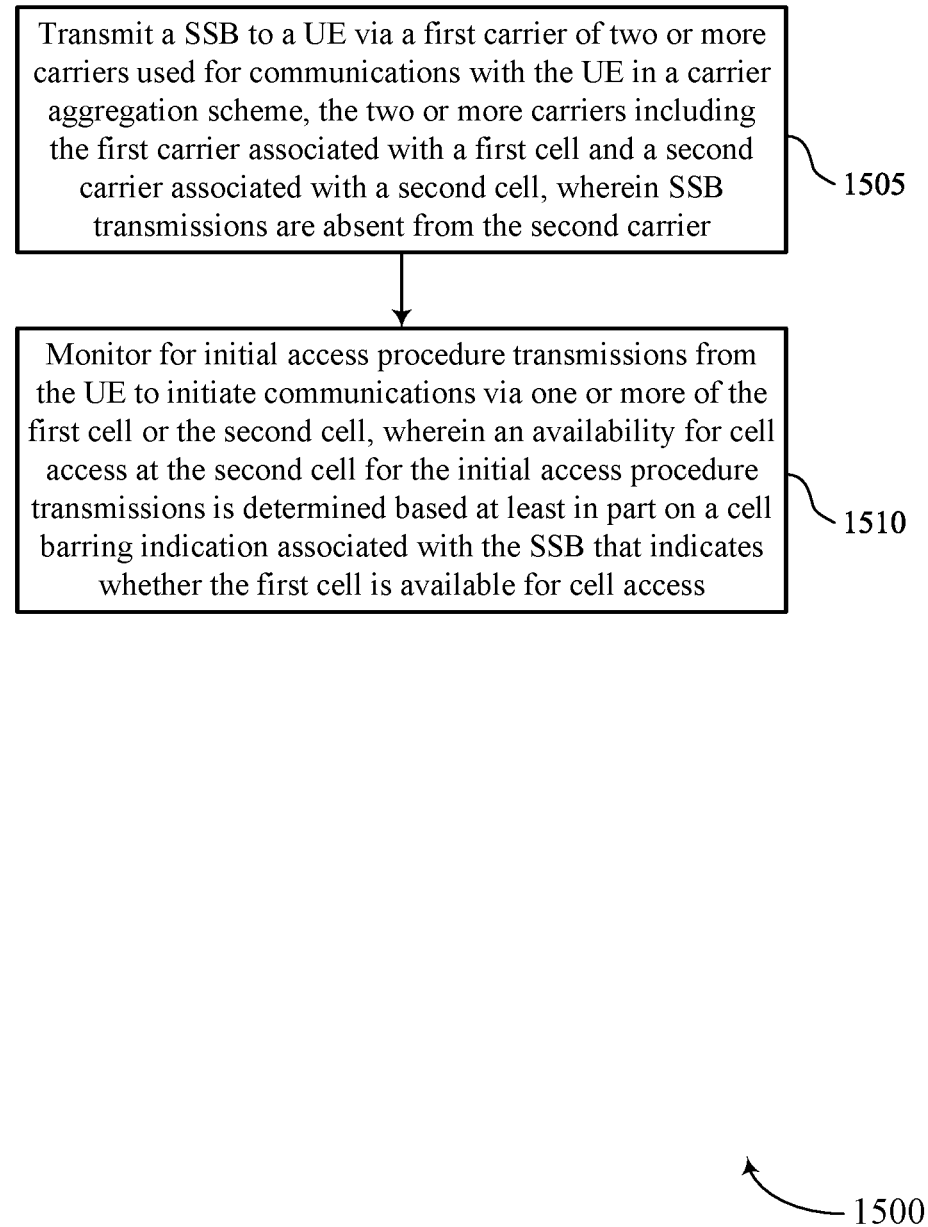

FIG. 15 shows a flowchart illustrating a method 1500 that supports cell barring techniques for carrier aggregation in wireless communications in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a SSB to a UE via a first carrier of two or more carriers used for communications with the UE in a carrier aggregation scheme, the two or more carriers including the first carrier associated with a first cell and a second carrier associated with a second cell, where SSB transmissions are absent from the second carrier. The operations of 1505 may be performed in accordance with examples as disclosed herein. In some examples, aspects of the operations of 1505 may be performed by an SSB manager 1125 as described with reference to FIG. 11.

At 1510, the method may include monitoring for initial access procedure transmissions from the UE to initiate communications via one or more of the first cell or the second cell, where an availability for cell access at the second cell for the initial access procedure transmissions is determined based on a cell barring indication associated with the SSB that indicates whether the first cell is available for cell access. The operations of 1510 may be performed in accordance with examples as disclosed herein. In some examples, aspects of the operations of 1510 may be performed by a cell access manager 1130 as described with reference to FIG. 11.

Figure 16:
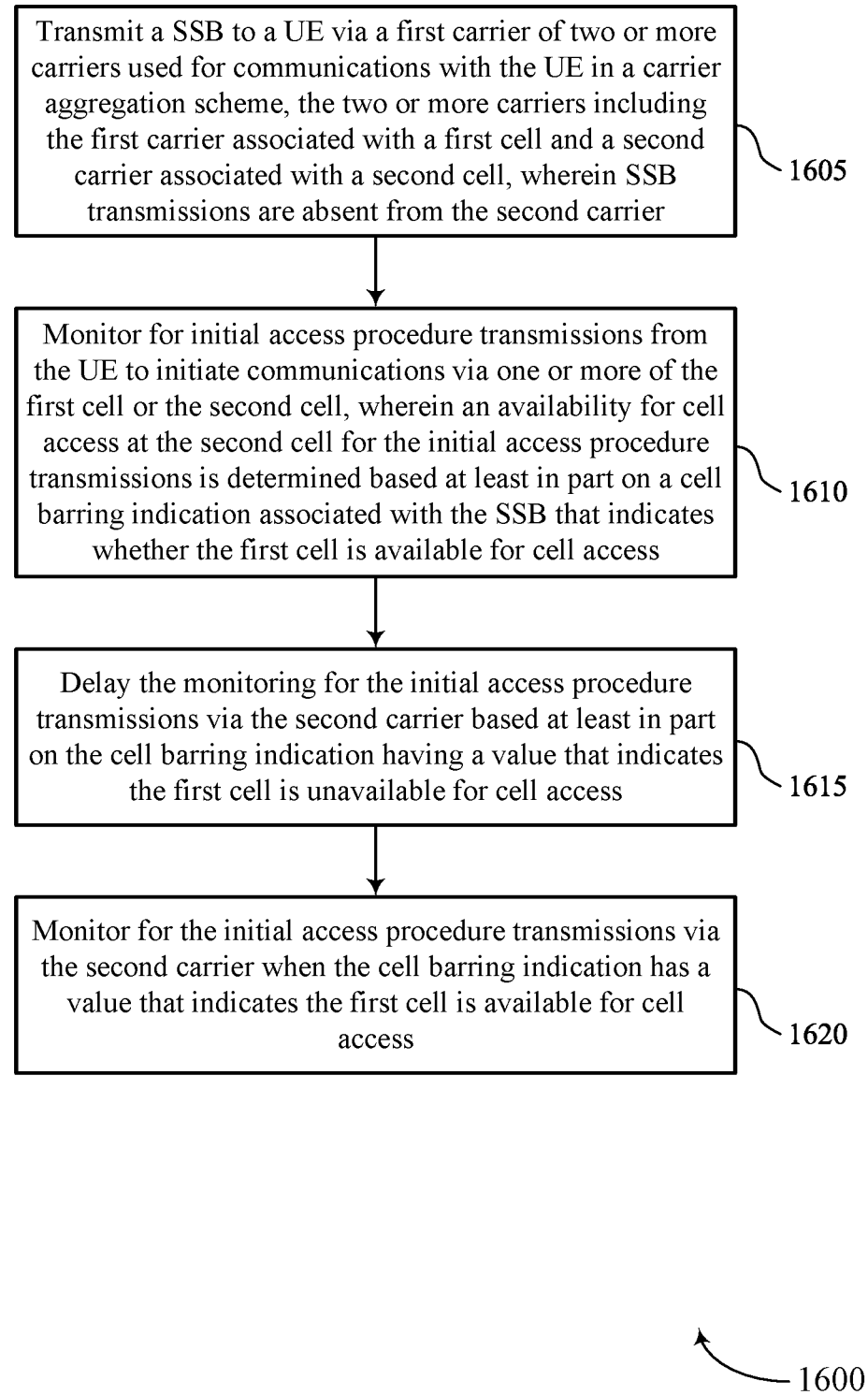

FIG. 16 shows a flowchart illustrating a method 1600 that supports cell barring techniques for carrier aggregation in wireless communications in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a SSB to a UE via a first carrier of two or more carriers used for communications with the UE in a carrier aggregation scheme, the two or more carriers including the first carrier associated with a first cell and a second carrier associated with a second cell, where SSB transmissions are absent from the second carrier. The operations of 1605 may be performed in accordance with examples as disclosed herein. In some examples, aspects of the operations of 1605 may be performed by an SSB manager 1125 as described with reference to FIG. 11.

At 1610, the method may include monitoring for initial access procedure transmissions from the UE to initiate communications via one or more of the first cell or the second cell, where an availability for cell access at the second cell for the initial access procedure transmissions is determined based on a cell barring indication associated with the SSB that indicates whether the first cell is available for cell access. The operations of 1610 may be performed in accordance with examples as disclosed herein. In some examples, aspects of the operations of 1610 may be performed by a cell access manager 1130 as described with reference to FIG. 11.

At 1615, the method may include delaying the monitoring for the initial access procedure transmissions via the second carrier based on the cell barring indication having a value that indicates the first cell is unavailable for cell access. The operations of 1615 may be performed in accordance with examples as disclosed herein. In some examples, aspects of the operations of 1615 may be performed by a cell barring manager 1135 as described with reference to FIG. 11.

At 1620, the method may include monitoring for the initial access procedure transmissions via the second carrier when the cell barring indication has a value that indicates the first cell is available for cell access. The operations of 1620 may be performed in accordance with examples as disclosed herein. In some examples, aspects of the operations of 1620 may be performed by a cell access manager 1130 as described with reference to FIG. 11.

The following provides an overview of aspects of the present disclosure:

Aspect 1: A method for wireless communication at a UE, comprising: receiving a synchronization signal block via a first carrier of two or more carriers used for communications in a carrier aggregation scheme, the two or more carriers including the first carrier associated with a first cell and a second carrier associated with a second cell, wherein synchronization signal block transmissions are absent from the second carrier; and initiating an initial access procedure at the UE to initiate communications via one or more of the first cell or the second cell, wherein an availability for cell access at the second cell is determined based at least in part on a cell barring indication associated with the synchronization signal block that indicates whether the first cell is available for cell access.

Aspect 2: The method of aspect 1, further comprising: delaying an initial access request transmission via the second carrier based at least in part on the cell barring indication having a value that indicates the first cell is unavailable for cell access; and transmitting the initial access request via the second carrier when the cell barring indication has a value that indicates the first cell is available for cell access.

Aspect 3: The method of any of aspects 1 through 2, wherein the first carrier is an anchor carrier for a virtual cell, and the second carrier is a non-anchor carrier for the virtual cell.

Aspect 4: The method of aspect 3, wherein the synchronization signal block includes the cell barring indication in a master information block (MIB) that is transmitted in the synchronization signal block, wherein the cell barring indication is for the anchor carrier, and wherein the cell barring indication is applied to each of the anchor carrier and the non-anchor carrier.

Aspect 5: The method of aspect 1, wherein the cell barring indication in the first carrier includes a first cell barring indication associated with the first cell, and a second cell barring indication associated with the second cell, and wherein the initial access procedure is initiated for the second cell based at least in part on the second cell barring indication.

Aspect 6: The method of aspect 5, wherein the carrier aggregation scheme uses at least the first carrier, the second carrier, and a third carrier, and both the second carrier and the third carrier do not carry synchronization signal block transmissions, and wherein the second cell barring indication applies to each carrier that does not carry synchronization signal block transmissions.

Aspect 7: The method of any of aspects 5 through 6, wherein the carrier aggregation scheme uses at least the first carrier, the second carrier, and a third carrier, and both the second carrier and the third carrier do not carry synchronization signal block transmissions, and wherein the second cell barring indication includes separate indications for each of the second carrier and the third carrier.

Aspect 8: The method of any of aspects 1 through 7, wherein the cell barring indication is provided by one or more access control parameters in an SIB that is transmitted via the first carrier, and wherein the one or more access control parameters in the SIB are applied to each of the first carrier and the second carrier.

Aspect 9: The method of aspect 8, wherein the SIB is received based at least in part on information from the synchronization signal block, and wherein the one or more access control parameters include separate cell barring indications for the first carrier and the second carrier.

Aspect 10: The method of any of aspects 1 through 9, wherein the first cell and the second cell form a virtual cell for communications according to the carrier aggregation scheme, and wherein the initiating the initial access procedure is further based at least in part on a RACH configuration of the virtual cell.

Aspect 11: The method of aspect 10, wherein the virtual cell is barred for the initial access procedure if the cell barring indication associated with any of the first cell or the second cell indicates unavailability for cell access.

Aspect 12: A method for wireless communication at a network entity, comprising: transmitting a synchronization signal block to a UE via a first carrier of two or more carriers used for communications with the UE in a carrier aggregation scheme, the two or more carriers including the first carrier associated with a first cell and a second carrier associated with a second cell, wherein synchronization signal block transmissions are absent from the second carrier; and monitoring for initial access procedure transmissions from the UE to initiate communications via one or more of the first cell or the second cell, wherein an availability for cell access at the second cell for the initial access procedure transmissions is determined based at least in part on a cell barring indication associated with the synchronization signal block that indicates whether the first cell is available for cell access.

Aspect 13: The method of aspect 12, further comprising: delaying the monitoring for the initial access procedure transmissions via the second carrier based at least in part on the cell barring indication having a value that indicates the first cell is unavailable for cell access; and monitoring for the initial access procedure transmissions via the second carrier when the cell barring indication has a value that indicates the first cell is available for cell access.

Aspect 14: The method of any of aspects 12 through 13, wherein the first carrier is an anchor carrier for a virtual cell, and the second carrier is a non-anchor carrier for the virtual cell.

Aspect 15: The method of aspect 14, wherein the synchronization signal block includes the cell barring indication in a master information block (MIB) that is transmitted in the synchronization signal block, wherein the cell barring indication is for the anchor carrier, and wherein the cell barring indication is applied to each of the anchor carrier and the non-anchor carrier.

Aspect 16: The method of aspect 12, wherein the cell barring indication in the first carrier includes a first cell barring indication associated with the first cell, and a second cell barring indication associated with the second cell, and wherein the initial access procedure is initiated for the second cell based at least in part on the second cell barring indication.

Aspect 17: The method of aspect 16, wherein the carrier aggregation scheme uses at least the first carrier, the second carrier, and a third carrier, and both the second carrier and the third carrier do not carry synchronization signal block transmissions, and wherein the second cell barring indication applies to each carrier that does not carry synchronization signal block transmissions.

Aspect 18: The method of any of aspects 16 through 17, wherein the carrier aggregation scheme uses at least the first carrier, the second carrier, and a third carrier, and both the second carrier and the third carrier do not carry synchronization signal block transmissions, and wherein the second cell barring indication includes separate indications for each of the second carrier and the third carrier.

Aspect 19: The method of any of aspects 12 through 18, wherein the cell barring indication is provided by one or more access control parameters in an SIB that is transmitted via the first carrier, and wherein the one or more access control parameters in the SIB are applied to each of the first carrier and the second carrier.

Aspect 20: The method of aspect 19, wherein the SIB is transmitted using resources that are indicated in the synchronization signal block, and wherein the one or more access control parameters include separate cell barring indications for the first carrier and the second carrier.

Aspect 21: The method of any of aspects 12 through 20, wherein the first cell and the second cell form a virtual cell for communications according to the carrier aggregation scheme, and wherein cell access associated with the initial access procedure is further based at least in part on a RACH configuration of the virtual cell.

Aspect 22: The method of aspect 21, wherein the virtual cell is barred for the initial access procedure if the cell barring indication associated with any of the first cell or the second cell indicates unavailability for cell access.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising a processor; memory coupled with the processor; and instructions stored in the memory and executable by the processor to cause the apparatus to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a synchronization signal block via a first carrier of two or more carriers used for communications in a carrier aggregation scheme, the two or more carriers including the first carrier associated with a first cell and a second carrier associated with a second cell, wherein synchronization signal block transmissions are absent from the second carrier; and
initiating an initial access procedure at the UE to initiate communications via one or more of the first cell or the second cell, wherein an availability for cell access at the second cell is determined based at least in part on a cell barring indication associated with the synchronization signal block that indicates whether the first cell is available for cell access.

2. The method of claim 1, further comprising:
delaying an initial access request transmission via the second carrier based at least in part on the cell barring indication having a value that indicates the first cell is unavailable for cell access; and
transmitting the initial access request via the second carrier when the cell barring indication has a value that indicates the first cell is available for cell access.

3. The method of claim 1, wherein the first carrier is an anchor carrier for a virtual cell, and the second carrier is a non-anchor carrier for the virtual cell.

4. The method of claim 3, wherein the synchronization signal block includes the cell barring indication in a master information block (MIB) that is transmitted in the synchronization signal block, wherein the cell barring indication is for the anchor carrier, and wherein the cell barring indication is applied to each of the anchor carrier and the non-anchor carrier.

5. The method of claim 1, wherein the cell barring indication in the first carrier includes a first cell barring indication associated with the first cell, and a second cell barring indication associated with the second cell, and wherein the initial access procedure is initiated for the second cell based at least in part on the second cell barring indication.

6. The method of claim 5, wherein the carrier aggregation scheme uses at least the first carrier, the second carrier, and a third carrier, and both the second carrier and the third carrier do not carry synchronization signal block transmissions, and wherein the second cell barring indication applies to each carrier that does not carry synchronization signal block transmissions.

7. The method of claim 5, wherein the carrier aggregation scheme uses at least the first carrier, the second carrier, and a third carrier, and both the second carrier and the third carrier do not carry synchronization signal block transmissions, and wherein the second cell barring indication includes separate indications for each of the second carrier and the third carrier.

8. The method of claim 1, wherein the cell barring indication is provided by one or more access control parameters in a system information block (SIB) that is transmitted via the first carrier, and wherein the one or more access control parameters in the SIB are applied to each of the first carrier and the second carrier.

9. The method of claim 8, wherein the SIB is received based at least in part on information from the synchronization signal block, and wherein the one or more access control parameters include separate cell barring indications for the first carrier and the second carrier.

10. The method of claim 1, wherein the first cell and the second cell form a virtual cell for communications according to the carrier aggregation scheme, and wherein the initiating the initial access procedure is further based at least in part on a random access channel (RACH) configuration of the virtual cell.

11. The method of claim 10, wherein the virtual cell is barred for the initial access procedure if the cell barring indication associated with any of the first cell or the second cell indicates unavailability for cell access.

12. A method for wireless communication at a network entity, comprising:
transmitting a synchronization signal block to a user equipment (UE) via a first carrier of two or more carriers used for communications with the UE in a carrier aggregation scheme, the two or more carriers including the first carrier associated with a first cell and a second carrier associated with a second cell, wherein synchronization signal block transmissions are absent from the second carrier; and
monitoring for initial access procedure transmissions from the UE to initiate communications via one or more of the first cell or the second cell, wherein an availability for cell access at the second cell for the initial access procedure transmissions is determined based at least in part on a cell barring indication associated with the synchronization signal block that indicates whether the first cell is available for cell access.

13. The method of claim 12, further comprising:
delaying the monitoring for the initial access procedure transmissions via the second carrier based at least in part on the cell barring indication having a value that indicates the first cell is unavailable for cell access; and
monitoring for the initial access procedure transmissions via the second carrier when the cell barring indication has a value that indicates the first cell is available for cell access.

14. The method of claim 12, wherein the first carrier is an anchor carrier for a virtual cell, and the second carrier is a non-anchor carrier for the virtual cell.

15. The method of claim 14, wherein the synchronization signal block includes the cell barring indication in a master information block (MIB) that is transmitted in the synchronization signal block, wherein the cell barring indication is for the anchor carrier, and wherein the cell barring indication is applied to each of the anchor carrier and the non-anchor carrier.

16. The method of claim 12, wherein the cell barring indication in the first carrier includes a first cell barring indication associated with the first cell, and a second cell barring indication associated with the second cell, and wherein the initial access procedure is initiated for the second cell based at least in part on the second cell barring indication.

17. The method of claim 16, wherein the carrier aggregation scheme uses at least the first carrier, the second carrier, and a third carrier, and both the second carrier and the third carrier do not carry synchronization signal block transmissions, and wherein the second cell barring indication applies to each carrier that does not carry synchronization signal block transmissions.

18. The method of claim 16, wherein the carrier aggregation scheme uses at least the first carrier, the second carrier, and a third carrier, and both the second carrier and the third carrier do not carry synchronization signal block transmissions, and wherein the second cell barring indication includes separate indications for each of the second carrier and the third carrier.

19. The method of claim 12, wherein the cell barring indication is provided by one or more access control parameters in a system information block (SIB) that is transmitted via the first carrier, and wherein the one or more access control parameters in the SIB are applied to each of the first carrier and the second carrier.

20. The method of claim 19, wherein the SIB is transmitted using resources that are indicated in the synchronization signal block, and wherein the one or more access control parameters include separate cell barring indications for the first carrier and the second carrier.

21. The method of claim 12, wherein the first cell and the second cell form a virtual cell for communications according to the carrier aggregation scheme, and wherein cell access associated with the initial access procedure is further based at least in part on a random access channel (RACH) configuration of the virtual cell.

22. The method of claim 21, wherein the virtual cell is barred for the initial access procedure if the cell barring indication associated with any of the first cell or the second cell indicates unavailability for cell access.

23. An apparatus for wireless communication at a user equipment (UE), comprising:
a processor;
memory coupled with the processor; and
instructions stored in the memory and executable by the processor to cause the apparatus to:
receive a synchronization signal block via a first carrier of two or more carriers used for communications in a carrier aggregation scheme, the two or more carriers including the first carrier associated with a first cell and a second carrier associated with a second cell, wherein synchronization signal block transmissions are absent from the second carrier; and
initiate an initial access procedure at the UE to initiate communications via one or more of the first cell or the second cell, wherein an availability for cell access at the second cell is determined based at least in part on a cell barring indication associated with the synchronization signal block that indicates whether the first cell is available for cell access.

24. The apparatus of claim 23, wherein the instructions are further executable by the processor to cause the apparatus to:
delay an initial access request transmission via the second carrier based at least in part on the cell barring indication having a value that indicates the first cell is unavailable for cell access; and
transmit the initial access request via the second carrier when the cell barring indication has a value that indicates the first cell is available for cell access.

25. The apparatus of claim 23, wherein the first carrier is an anchor carrier for a virtual cell, and the second carrier is a non-anchor carrier for the virtual cell.

26. The apparatus of claim 23, wherein the cell barring indication in the first carrier includes a first cell barring indication associated with the first cell, and a second cell barring indication associated with the second cell, and wherein the initial access procedure is initiated for the second cell based at least in part on the second cell barring indication.

27. The apparatus of claim 23, wherein the cell barring indication is provided by one or more access control parameters in a system information block (SIB) that is transmitted via the first carrier, and wherein the one or more access control parameters in the SIB are applied to each of the first carrier and the second carrier.

28. An apparatus for wireless communication at a network entity, comprising:
a processor;
memory coupled with the processor; and
instructions stored in the memory and executable by the processor to cause the apparatus to:
transmit a synchronization signal block to a user equipment (UE) via a first carrier of two or more carriers used for communications with the UE in a carrier aggregation scheme, the two or more carriers including the first carrier associated with a first cell and a second carrier associated with a second cell, wherein synchronization signal block transmissions are absent from the second carrier; and
monitor for initial access procedure transmissions from the UE to initiate communications via one or more of the first cell or the second cell, wherein an availability for cell access at the second cell for the initial access procedure transmissions is determined based at least in part on a cell barring indication associated with the synchronization signal block that indicates whether the first cell is available for cell access.

29. The apparatus of claim 28, wherein the instructions are further executable by the processor to cause the apparatus to:
delay the monitoring for the initial access procedure transmissions via the second carrier based at least in part on the cell barring indication having a value that indicates the first cell is unavailable for cell access; and
monitor for the initial access procedure transmissions via the second carrier when the cell barring indication has a value that indicates the first cell is available for cell access.

30. The apparatus of claim 28, wherein the cell barring indication in the first carrier includes a first cell barring indication associated with the first cell, and a second cell barring indication associated with the second cell, and wherein the initial access procedure is initiated for the second cell based at least in part on the second cell barring indication.

* * * * *